United States Patent
Zitnick, III

(10) Patent No.: US 9,880,990 B2
(45) Date of Patent: Jan. 30, 2018

(54) LEVERAGING PREVIOUS INSTANCES OF HANDWRITING FOR HANDWRITING BEAUTIFICATION AND OTHER APPLICATIONS

(71) Applicant: Microsoft Corporation, Redmond, WA (US)

(72) Inventor: Charles L. Zitnick, III, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 699 days.

(21) Appl. No.: 13/831,163

(22) Filed: Mar. 14, 2013

(65) Prior Publication Data
US 2014/0281947 A1 Sep. 18, 2014

(51) Int. Cl.
G06F 17/24 (2006.01)
G06K 9/00 (2006.01)
G06T 11/20 (2006.01)
G06K 9/62 (2006.01)

(52) U.S. Cl.
CPC ....... *G06F 17/242* (2013.01); *G06K 9/00402* (2013.01); *G06K 9/6255* (2013.01); *G06T 11/203* (2013.01)

(58) Field of Classification Search
CPC .... G06F 3/017; G06F 3/048838; G06F 17/24; G06F 17/242; G06K 9/00416; G06K 9/00429; G06K 9/222; G06K 9/00436; G06K 9/6255; G06K 9/00402; G06T 11/203
See application file for complete search history.

(56) References Cited

U.S. PATENT DOCUMENTS

| | | | |
|---|---|---|---|
| 5,038,382 A * | 8/1991 | Lipscomb | G06K 9/00416 382/189 |
| 5,371,845 A | 12/1994 | Newell et al. | |
| 5,454,046 A * | 9/1995 | Carman, II | G06K 9/68 382/186 |

(Continued)

FOREIGN PATENT DOCUMENTS

| | | |
|---|---|---|
| CN | 101308578 A | 11/2008 |
| JP | H10171437 A | 6/1998 |

OTHER PUBLICATIONS

Arvo, et al., "Fluid Sketches: Continuous Recognition and Morphing of Simple Hand-drawn Shapes," retrieved at <<http://acm.org>>, Proceedings of the 13th Annual ACM Symposium on User interface Software and Technology, 2000, pp. 73-80.

(Continued)

*Primary Examiner* — Wilson Tsui
(74) *Attorney, Agent, or Firm* — Rainier Patents, P.S.

(57) ABSTRACT

A stroke processing system (SPS) is described which processes a user's current instance of handwriting with reference to previous instances of handwriting. In one application, the SPS matches a new token input by a user (corresponding to a sequence of stroke samples) with previous tokens that are similar to the new token. The SPS then refines the new token by averaging it with the previous tokens. This improves the appearance of the new token. In another application, the SPS uses the previous tokens to produce a search result. In another application, the SPS uses the previous tokens to perform an auto-completion operation.

20 Claims, 23 Drawing Sheets

(56) References Cited

U.S. PATENT DOCUMENTS

| | | | |
|---|---|---|---|
| 5,544,257 A * | 8/1996 | Bellegarda | G06K 9/6297 |
| | | | 382/186 |
| 5,687,254 A | 11/1997 | Poon et al. | |
| 5,742,705 A * | 4/1998 | Parthasarathy | G06K 9/6857 |
| | | | 382/185 |
| 6,052,481 A * | 4/2000 | Grajski | G06K 9/68 |
| | | | 382/187 |
| 6,298,154 B1 * | 10/2001 | Cok | G06K 9/222 |
| | | | 345/467 |
| 6,567,548 B2 | 5/2003 | Nathan et al. | |
| 6,731,826 B1 | 5/2004 | Yamamoto et al. | |
| 7,212,968 B1 | 5/2007 | Garner et al. | |
| 7,295,688 B2 | 11/2007 | Hara et al. | |
| 7,379,627 B2 | 5/2008 | Li et al. | |
| 7,590,307 B2 | 9/2009 | Wang et al. | |
| 7,593,602 B2 | 9/2009 | Stentiford | |
| 7,616,201 B2 | 11/2009 | Foster | |
| 7,639,250 B2 | 12/2009 | Xu et al. | |
| 7,647,331 B2 | 1/2010 | Li et al. | |
| 8,213,719 B2 | 7/2012 | Vukosavljevic et al. | |
| 8,300,883 B2 | 10/2012 | Wang et al. | |
| 2001/0038999 A1 | 11/2001 | Hainey, II | |
| 2004/0021691 A1 * | 2/2004 | Dostie | G06F 3/0237 |
| | | | 715/773 |
| 2004/0148577 A1 * | 7/2004 | Xu | G06F 3/04883 |
| | | | 715/268 |
| 2005/0100243 A1 | 5/2005 | Shum et al. | |
| 2006/0045343 A1 | 3/2006 | Tremblay et al. | |
| 2006/0274943 A1 * | 12/2006 | Abdulkader | G06K 9/00429 |
| | | | 382/186 |
| 2007/0003142 A1 * | 1/2007 | Simard | G06K 9/00416 |
| | | | 382/187 |
| 2007/0025618 A1 * | 2/2007 | Lin | G06K 9/00416 |
| | | | 382/186 |
| 2007/0047817 A1 * | 3/2007 | Abdulkader | G06K 9/6255 |
| | | | 382/182 |
| 2007/0112754 A1 | 5/2007 | Haigh et al. | |
| 2008/0003549 A1 | 1/2008 | Fine et al. | |
| 2009/0116744 A1 * | 5/2009 | Woo | G06K 9/6255 |
| | | | 382/187 |
| 2009/0278848 A1 | 11/2009 | Robertson et al. | |
| 2009/0324082 A1 * | 12/2009 | Liu | G06F 3/018 |
| | | | 382/185 |
| 2011/0142370 A1 | 6/2011 | Joshi et al. | |
| 2012/0239397 A1 | 9/2012 | Napper et al. | |
| 2012/0295231 A1 | 11/2012 | Zitnick, III et al. | |
| 2013/0147809 A1 | 6/2013 | Zhenbo et al. | |

OTHER PUBLICATIONS

Bahlmann, et al., "The Writer Independent Online Handwriting Recognition System frog on hand and Cluster Generative Statistical Dynamic Time Warping," retrieved at <<http://lmb.informatik.uni-freiburg.de/people/bahlmann/data/ba_bu_tpami04.pdf>>, IEEE Transactions on Pattern Analysis and Machine Intelligence, vol. 26, Issue 3, 2004, 12 pages.

Bahlmann, et al., "Online Handwriting Recognition with Support Vector Machines—A Kernel Approach," retrieved at <<http://ieeexplore.ieee.org/stamp/stamp.jsp?tp=&arnumber=1030883>>, Proceedings of the Eighth International Workshop on Frontiers in Handwriting Recognition, 2002, 6 pages.

Belhumeur, Peter N., "A Bayesian Approach to Binocular Steropsis," retrieved at <<http://web1.cs.columbia.edu/~belhumeur/journal/bayesian-ijcv96.ps>>, International Journal of Computer Vision, vol. 19, Issue 3, 1996, 26 pages.

Buades, et al., "A non-local algorithm for image denoising," retrieved at <<http://ieeexplore.ieee.org/stamp/stamp.jsp?tp=&arnumber=1467423>>, Proceedings of the 2005 IEEE Computer Society Conference on Computer Vision and Pattern Recognition, 2005, 6 pages.

Cole, et al., "Where Do People Draw Lines?," retrieved at <<http://acm.org>>, Communications of the ACM, vol. 55, Issue 1, Jan. 2012, pp. 107-115.

Dixon, et al., "iCanDraw: Using Sketch Recognition and Corrective Feedback to Assist a User in Drawing Human Faces," retrieved at <<http://acm.org>>, Proceedings of the SIGCHI Conference on Human Factors in Computing Systems, 2010, pp. 897-906.

Dudek, et al., "Shape Representation and Recognition From Multiscale Curvature," Computer Vision and Image Understanding, vol. 68, Issue 2, Nov. 1997, pp. 170-189.

Efros, et al., "Texture Synthesis by Nonparametric Sampling," retrieved at <<http://ieeexplore.ieee.org/stamp/stamp.jsp?tp=&arnumber=790383>>, Proceedings of the Seventh IEEE International Conference on Computer Vision, vol. 2, 1999, 6 pages.

Eitz, et al., "How Do Humans Sketch Objects?," retrieved at <<http://acm.org>>, ACM Transactions on Graphics, Conference Proceedings, vol. 31, Issue 4, Article No. 44, Jul. 2012, 10 pages.

Graves, et al., "A Novel Connectionist System for Unconstrained Handwriting Recognition," retrieved at << http://ieeexplore.ieee.org/stamp/stamp.jsp?tp=&arnumber=4531750>>, IEEE Transactions on Pattern Analysis and Machine Intelligence, vol. 31, Issue 5, May 2009, pp. 855-868.

Guyon, et al., "Unipen Project of On-line Data Exchange and Recognizer Benchmarks," retrieved at <<http://ieeexplore.ieee.org/stamp/stamp.jsp?tp=&arnumber=576870>>, Proceedings of the 12th IAPR International Conference on Pattern Recognition, vol. 2, 1994, pp. 29-33.

Hilaire, et al., "Robust and Accurate Vectorization of Line Drawings," retrieved at <<http://ieeexplore.ieee.org/stamp/stamp.jsp?tp=&arnumber=1624354>>, IEEE Transactions on Pattern Analysis and Machine Intelligence, vol. 28, Issue 6, 2006, pp. 890-904.

Igarashi, et al., "Interactive Beautification: A Technique for Rapid Geometric Design," retrieved at <<http://acm.org>>, ACM SIGGRAPH 2007, Article No. 18, 2007, pp. 105-114.

Igarashi, et al., "Teddy: A Sketching Interface for 3D Freeform Design," retrieved at <<http://acm.org>>, ACM SIGGRAPH 2007, Article No. 21, 2007, 8 pages.

Jain, et al., "Indexing and Retrieval of On-line Handwritten Documents," retrieved at <<http://ieeexplore.ieee.org/stamp/stamp.jsp?tp=&arnumber=1227743>>, Proceedings of the Seventh International Conference on Document Analysis and Recognition, 2003, 5 pages.

Jawahar, et al., "Retrieval of Online Handwriting by Synthesis and Matching," retrieved at <<http://cvit.iiit.ac.in/papers/SearchBySynthesis.pdf>>, Pattern Recognition, vol. 42, Issue 7, Jul. 2009, 28 pages.

Karpenko, et al., "Smoothsketch: 3D free form shapes from complex sketches," retrieved at <<http://acm.org>>, ACM Transactions on Graphics, vol. 25, Issue 3, Jul. 2006, pp. 589-598.

Lecun, et al., "Gradient-based Learning Applied to Document Recognition," retrieved at <<yann.lecun.com/exdb/publis/pdf/lecun-01a.pdf>>, Proceedings of the IEEE, vol. 86, Issue 11, 1998, 46 pages.

Lee, et al., "Shadowdraw: Real Time User Guidance for Freehand Drawing," retrieved at <<http://acm.org>>, ACM Transactions on Graphics, vol. 30, Issue 4, Article No. 27, Jul. 2011, 10 pages.

Mokhtarian, et al., "A Theory of Multiscale, Curvature-based Shape Representation for Planar Curves," retrieved at <<http://ieeexplore.ieee.org/stamp/stamp.jsp?tp=&arnumber=149591>>, IEEE Transactions on Pattern Analysis and Machine Intelligence, vol. 14, Issue 8, 1992, pp. 789-805.

Olsen, et al., "Sketch-based modeling: A survey," retrieved at <<http://www.sciencedirect.com>>, Computers & Graphics, No. 33, 2009, pp. 85-103.

Orbay, et al., "Beautification of Design Sketches Using Trainable Stroke Clustering and Curve Fitting," retrieved at <<http://ieeexplore.ieee.org/stamp/stamp.jsp?tp=&arnumber=5710858>>, IEEE Transactions on Visualization and Computer Graphics, vol. 17, Issue 5, 2011, pp. 694-708.

Pavlidis, et al., "An Automatic Beautifier for Drawings and Illustrations," retrieved at <<http://acm.org>>, Proceedings of the 12th Annual Conference on Computer Graphics and Interactive Techniques, vol. 19, No. 3, 1985, pp. 225-234.

(56) References Cited

OTHER PUBLICATIONS

Plamondon, et al., "Online and Off-line Handwriting Recognition: A Comprehensive Survey," retrieved at <<http://ieeexplore.ieee.org/stamp/stamp.jsp?tp=&arnumber=824821>>, IEEE Transactions on Pattern Analysis and Machine Intelligence, vol. 22, Issue 1, 2000, pp. 63-84.

Plötz, et al., "Markov models for offline handwriting recognition: A survey," International Journal on Document Analysis and Recognition, vol. 12, Issue 4, 2009, pp. 269-298.

Rivers, et al., "Sculpting by Numbers," retrieved at <<http://acm.org>>, ACM Transactions on Graphics, vol. 31, Issue 6, Article No. 157, Nov. 2012, 8 pages.

Roberts, et al., "Handwriting Remediation: A Comparison of Computer-based and Traditional Approaches," Journal of Educational Research, vol. 87, Issue 2, 1993, pp. 118-125.

Schmid, et al., "Overcoat: An Implicit Canvas for 3d Painting," retrieved at <<http://acm.org>>, ACM Transactions on Graphics, vol. 30, Issue 4, Article No. 28, Jul. 2011, 10 pages.

Senior, et al., "An Off-line Cursive Handwriting Recognition System," retrieved at <<http://ieeexplore.ieee.org/stamp/stamp.jsp?tp=&arnumber=667887>>, IEEE Transactions on Pattern Analysis and Machine Intelligence, vol. 20, Issue 3, 1998, pp. 309-321.

Simard, et al., "Ink Normalization and Beautification," retrieved at <<http://ieeexplore.ieee.org/stamp/stamp.jsp?tp=&arnumber=1575730>>, Proceedings of the Eighth International Conference on Document Analysis and Recognition, 2005, 6 pages.

Tombre, et al., "Stable and Robust Vectorization: How to Make the Right Choices," retrieved at <<http://citeseerx.ist.psu.edu/viewdoc/download?doi=10.1.1.43.3351&rep=rep1&type=pdf>>, Proceeding GREC '99, Selected Papers from the Third International Workshop on Graphics Recognition, Recent Advances, 1999, 14 pages.

Vinciarelli, et al., "Combining Online and Offline Handwriting Recognition," retrieved at <<http://ieeexplore.ieee.org/stamp/stamp.jsp?tp=&arnumber=1227781>>, Proceedings of Seventh International Conference on Document Analysis and Recognition, 2003, 5 pages.

Vinter, et al., "Effects of different types of learning on handwriting movements in young children," retrieved at <<http://www.sciencedirect.com>>, Learning and Instruction, No. 20, 2010, pp. 476-486.

Zanibbi, et al., "Aiding Manipulation of Handwritten Mathematical Expressions Through Style-Preserving Morphs," retrieved at <<https://ritdml.rit.edu/bitstream/handle/1850/7922/RZanibbiConfProc06-2001.pdf?sequence=1>>, Graphics Interface 2001, 2001, 8 pages.

"Designing the Use of Handwriting Recognition," retrieved at <<http://msdn.microsoft.com/en-us/library/ms819484.aspx>>, retrieved on Feb. 15, 2013, Microsoft Corporation, Redmond, Washington, 3 pages.

Richardson, Jeff, "Review: Notes Plus—take advanced notes, convert handwriting to text on the iPad," retrieved at <<http://www.iphonejd.com/iphone_jd/2012/01/review-notes-plus-take-advanced-notes-convert-handwriting-to-text.html>>, iPhone J.D., Jan. 24, 2012, 5 pages.

"MyScript Notes Mobile, the application which turns your iPad tablet into a real library of virtual notebooks!," retrieved at <<http://www.visionobjects.com/en/myscript/note-taking-and-forms-applications/myscript-notes-mobile/ios/>>, VisionObjects, retrieved on Feb. 15, 2013, 3 pages.

"Evernote for Mac User Guide," retrieved at << http://evernote.com/support/Evernote-Mac-Guide.pdf>>, retrieved on Feb. 15, 2013, Evernote Corporation, Redwood City, California, 35 pages.

Cheng, et al., "Comparing Character Recognition Based Approach with Feature Matching Based Approach for Digital Ink Search," retrieved at <<http://www.icfhr2012.uniba.it/paper089.pdf>>, Proceedings of the International Conference on Frontiers in Handwriting Recognition, Sep. 2012, pp. 546-551.

"International Preliminary Report on Patentability," From PCT Patent Application No. PCT/US2014/021462, 21 pages.

"Response to Written Opinion," from US PCT Patent Application No. PCT/US2014/021462, Filed Jan. 30, 2014, 10 pages.

Zitnick III, Charles Lawrence, "Handwriting Beautification Using Token Means," ACM Transactions on Graphics, vol. 32, No. 4, Jul. 1, 2013.

Jingwan et al., "HelpingHand: Example-Based Stroke Stylization," ACM Transactions on Graphics, vol. 31, No. 4, Jul. 2012, pp. 1-10.

"International Search Report and Written Opinion," From PCT Application No. PCT/US2014/021462, dated Jun. 18, 2014.

"Demand and Article 34 Amendments," From PCT Application No. PCT/US2014/021462, Filed: Sep. 25, 2014.

"Written Opinion," From PCT Application No. PCT/US2014/021462, dated Oct. 14, 2014.

"Notice Concerning Informal Communication with Applicant," From PCT Application No. PCT/US2014/021462, dated Dec. 19, 2014.

Voluntary Amendment filed Apr. 14, 2016 from China Patent Application No. 201480015172.4, 9 pages.

Fei-Fei et al., "Learning Generative Visual Models from Few Training Examples: An Incremental Bayesian Approach Tested on 101 Object Categories", Computer Vision and Pattern Recognition Workshop, 2004, 9 pages.

Gavilan et al., "Sketch-to Collage (sap_0333)", Special Interest Group on Computer Graphics and Interactive Techniques Conference, Aug. 5-9, 2007, 1 page.

Hays et al., "Scene Completion Using Millions of Photographs", Computer Graphics Proceedings, Annual Conference Series, Aug. 5-9, 2007, 7 pages.

Igarashi et al., "A Suggestive Interface for 3D Drawing", ACM UIST, 2001, 9 pages.

Igarashi et al., "Teddy: A Sketching Interface for 3D Freeform Design", ACM SIGGRAPH, 1999, 8 pages.

Jacobs et al., "Fast Multiresolution Image Querying", SIGGRAPH, 1995, 10 pages.

Lee et al., "Partition Min-Hash for Partial Duplicate Image Discovery", 11th European Conference on Computer Vision (ECCV), 2010, 14 pages.

Lowe, David G., "Distinctive Image Features from Scale-invariant Keypoints", ECCV, Jan. 5, 2004, 28 pages.

Nister et al., "Scalable Recognition with a Vocabulary Tree", Proceedings of the 2006 IEEE Computer Society Conference on Computer Vision and Pattern Recognition (CVPR'06), 2006, 8 pages.

Sivic et al., "Creating and Exploring a Large Photorealistic Virtual Space", IEEE Computer Society Conference on Computer Vision and Pattern Recognition Workshops, Jun. 23-28, 2008, 8 pages.

Wang et al., "MindFinder: Image Search by Interactive Sketching and Tagging", WWW 2010, Apr. 26-30, 2010, 4 pages.

Winder et al., "Picking the best Daisy", Computer Vision and Pattern Recognition, Jun. 2009, 8 pages.

Witten et al., "Managing Gigabytes: Compressing and Indexing Documents and Images", Morgan Kaufmann, 1999, 269 pages (in 4 PDFs).

Zitnick, C. Lawrence, "Binary Coherent Edge Descriptors", Computer Vision—ECCV, 11th European Conference on Computer Vision, Sep. 5-11, 2010, 14 pages.

Bhat et al., "GradientShop: A Gradient-Domain Optimization Framework for Image and Video Filtering", ACM Trans. Graph., vol. 29, No. 2, Article 10, Apr. 2010, 15 pages.

Cao et al., "MindFinder: Finding Images by Sketching", ACM Multimedia Conference, Apr. 26-30, 2010, retrieved at <<http://research.microsoft.com/en-us/projects/mindfinder>>on Jan. 14, 2013, 5 pages.

Lee et al., "ShadowDraw: Real-Time User Guidance for Freehand Drawing", ACM Trans. Graph., Jul. 2011, vol. 30, No. 4, 9 pages.

Baran et al., "Sketching Clothoid Splines Using Shortest Paths", Computer Graphics Forum, vol. 29, Jun. 7, 2010, 10 pages.

Chalechale et al., "Sketch-based image matching Using Angular partitioning", IEEE Transactions on Systems, Man and Cybernetics Part A: Systems and Humans, Jan. 2005, vol. 35, No. 1, 14 pages.

Chaudhuri et al., "Data-Driven Suggestions for Creativity Support in 3D Modeling", ACM SIGGRAPH Asia '10, 2010, 9 pages.

(56) References Cited

OTHER PUBLICATIONS

Hu et al., "Gradient Field Descriptor for Sketch Based Retrieval and Localization", 17th IEEE International Conference on Image Processing (ICIP), 2010, 4 pages.

Limpaecher et al., "Real-time drawing assistance through crowdsourcing," ACM Transactions on Graphics, vol. 32, No. 4, Jul. 2013, 8 pages.

Lu et al., "HelpingHand: Example-based Stroke Stylization", ACM Trans. Graph. vol. 31, No. 4, 2012, 10 pages.

Thiel et al., "Elasticurves: Exploiting Stroke Dynamics and Inertia for the Real-time Neatening of Sketched 2D Curves", UIST'11, Oct. 16-19, 2011, 10 pages.

Whitney, Hassler, "On regular closed curves in the plane", Compositio Mathematica, tome 4, 1937, pp. 276-284, 10 pages.

Non-Final Office Action dated Jan. 7, 2013 from U.S. Appl. No. 13/110,923, 23 pages.

Response filed May 7, 2013 to the Non-Final Office Action dated Jan. 7, 2013 from U.S. Appl. No. 13/110,923, 15 pages.

Final Office Action dated Jun. 17, 2013 from U.S. Appl. No. 13/110,923, 19 pages.

Response filed Oct. 16, 2013 to the Final Office Action dated Jun. 17, 2013 from U.S. Appl. No. 13/110,923, 12 pages.

Applicant Initiated Interview Summary dated Oct. 30, 2013 from U.S. Appl. No. 13/110,923, 3 pages.

Supplemental Amendment filed Nov. 7, 2013 from U.S. Appl. No. 13/110,923, 10 pages.

Non-Final Office Action dated Dec. 23, 2013 from U.S. Appl. No. 13/110,923, 20 pages.

Applicant Initiated Interview Summary dated Apr. 2, 2014 from U.S. Appl. No. 13/110,923, 3 pages.

Examiner Initiated Interview Summary dated Apr. 4, 2014 from U.S. Appl. No. 13/110,923, 2 pages.

Response filed Apr. 10, 2014 to the Non-Final Office Action dated Dec. 23, 2013 from U.S. Appl. No. 13/110,923, 11 pages.

Notice of Allowance dated Apr. 30, 2014 from U.S. Appl. No. 13/110,923, 9 pages.

Raymaekers et al., "Improving Sketching by Utilizing Haptic Feedback", AAAI Technical Report SS-02-08, 2002, 5 pages.

Ballard, D.H., "Generalizing the Hough Transform to Detect Arbitray Shapes", Pattern Recognition, vol. 13, No. 2, 1981, pp. 111-122, 12 pages.

Beaudot et al., "How long range is contour integration in human color vision?", Visual Neuroscience, vol. 20, 2003, pp. 51-64, 14 pages.

Canny, John, "A Computational Approach to Edge Detection", IEEE Transactions on Pattern Analysis and Machine Intelligence, vol. PAMI-8, No. 6, Nov. 1986, 20 pages.

Carson et al., "Blobworld: Image Segmentation Using Expectation-Maximization and Its Application to Image Querying", IEEE Transactions on Pattern Analysis and Machine Intelligence, vol. 24, No. 8, Aug. 2002, 13 pages.

Chen et al., "Sketch2Photo: Internet Image Montage", retrieved at <<http://www.ece.nus.edu.sg/stfpage/eletp/papers/sigasia09_sketch2photo.pdf>>, 2009, 10 pages.

Chum et al., "Total Recall: Automatic Query Expansion with a Generative Feature Model for Object Retrieval", retrieved at <<http://www.robots.ox.ac.uk/~vgg/publications-new/Public/2007/Chum07b/chum07b.pdf>>, 2007, 8 pages.

Chum et al., "Near Duplicate Image Detection: min-Hash and tf-idf Weighting", retrieved at <<http://www.robots.ox.ac.uk/~vgg/publications/papers/chum08a.pdf>>, 2008, 10 pages.

Cole et al., "Where do People Draw Lines?", retrieved at <<http://www.cs.princeton.edu/gfx/pubs/Cole_2008_WDP/cole_2008_wdp.pdf>>, 2008, 11 pages.

Datta et al., "Image Retrieval: Ideas, Influences, and Trends of the New Age", ACM Computing Surveys, vol. 40, No. 2, Article 5, Apr. 2008, 60 pages.

Eitz et al.,"Photosketch: A Sketch Based Image Query and Compositing System", Retrieved at <<http://user.cs.tuberlin.de/~eitz/pdf/2009_photosketch.pdf>>, 2009, 1 page.

Elder et al., "Image Editing in the Contour Domain", IEEE Transactions on Pattern Analysis and Machine Intelligence, vol. 23, No. 3, Mar. 2001, 6 pages.

* cited by examiner

ANY LOCAL/REMOTE DISTRIBUTION OF STROKE PROCESSING SYSTEM (SPS) FUNCTIONALITY

LEVERAGING PREVIOUS INSTANCES OF HANDWRITING FOR HANDWRITING BEAUTIFICATION AND OTHER APPLICATIONS

BACKGROUND

A user may use a stylus to write on a touch-sensitive display surface or on a digitizing pad. This mode of entry gives the user the freedom to produce handwritten content of any form, such as alphanumeric characters, pictures, etc. However, a user may write quickly and carelessly, thereby producing ill-formed characters and pictures. As a result, the user may later have difficulty interpreting his or her writing. Alternatively, or in addition, the user may be displeased with his or her writing for aesthetic reasons.

Techniques exist for automatically beautifying handwritten content. Many of these techniques operate by attempting to match the user's handwriting with canonical characters or shapes, and then replacing the user's handwriting with these characters or shapes. For example, one such technique can use handwriting recognition to interpret characters and words that a user has written, and then replace those characters and words with their typed formal counterparts. While useful, these techniques have various shortcomings. For example, the techniques are capable of only recognizing certain handwritten content, not content having any arbitrary form. Further, these techniques may only recognize characters and shapes that are sufficiently similar to their expected canonical counterparts.

SUMMARY

A stroke processing system (SPS) is described herein which processes handwritten content based on previous instances of the handwritten content. For example, in one approach, the SPS operates by receiving input strokes as the user writes on a writing surface of an input device. The SPS formulates a succession of tokens based on the input stroke samples. Each new token corresponds to a series of stroke samples. For each new token, the SPS then examines a collection of previous tokens to determine if there is at least one previous token that is similar to the new token. If so, the SPS performs an action based on the previous token(s).

In one action, the SPS modifies the new token based on the previous token(s), to thereby improve the appearance of the new token. For example, the SPS can average stroke samples in the new token with correlated stroke samples in the previous token(s). In doing so, the SPS treats the previous tokens as evidence pertaining to the shape of the new token that the user intended to draw.

In another action, the SPS provides a search result based on the previous token(s). For example, the SPS can identify occurrences of the previous token(s) in a document containing handwriting.

In another action, the SPS performs an auto-completion operation based on the previous token(s). Here, the SPS predicts a token that is determined to likely follow the new token, and notifies the user of the predicted token.

The SPS offers various benefits. Without limitation, the SPS can process handwriting that has any arbitrary form without the use of complex recognition algorithms. Further, in the beautification application, the SPS can modify a user's handwriting in a manner that preserves the general appearance of the user's handwriting style.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A presents an overview of a stroke processing system (SPS) that processes a current token (representing handwriting) based on previous tokens. The SPS includes a token formulation module, a similarity assessment module, a token refinement module, and optional other application modules. Section B provides further details regarding the token formation module. Section C provides further details regarding the similarity assessment module. Section D provides further details regarding the token refinement module. Section E provides further details regarding other application modules, such as search functionality and auto-completion functionality. And Section F describes illustrative computing functionality that can be used to implement any aspect of the features described in preceding sections.

Figure 26:
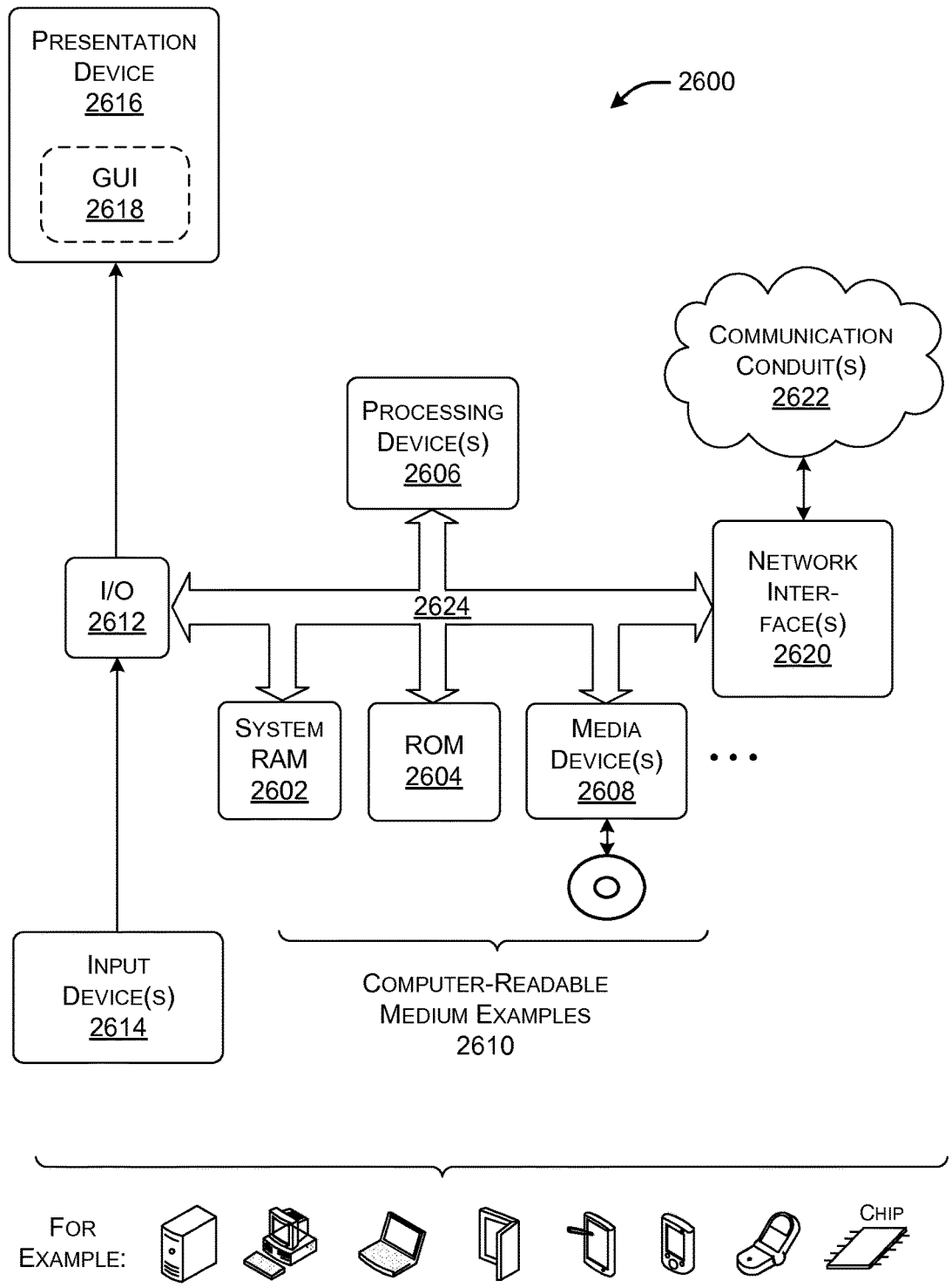
FIG. 26 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 26, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

Figure 1:
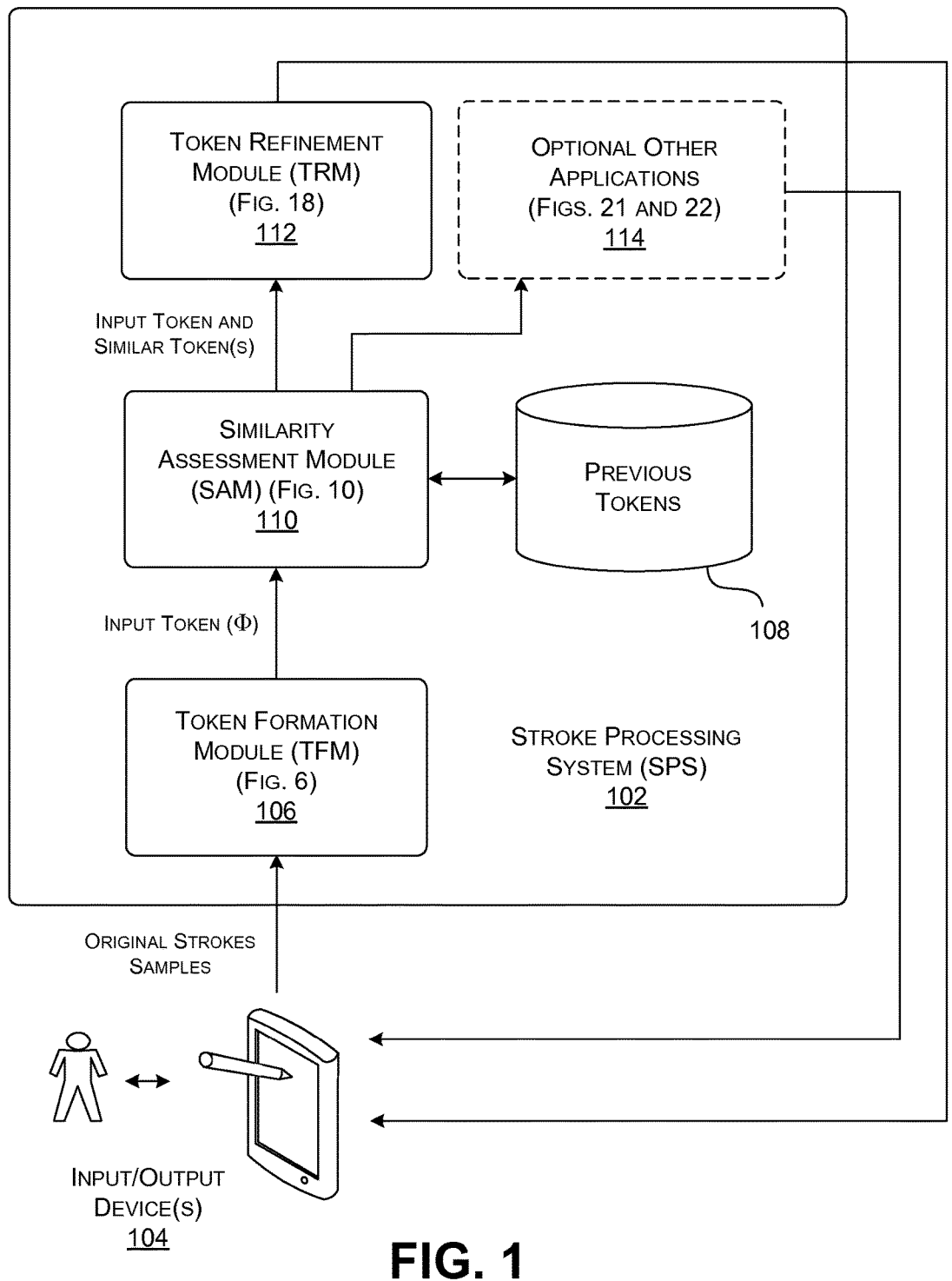
FIG. 1 shows an overview of a stroke processing system (SPS) for processing handwriting based on instances of previous handwriting.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Overview FIG. 1 shows an illustrative stroke processing system (SPS) 102 for processing handwriting. From a high-level perspective, the SPS 102 attempts to find previous instances of handwriting that match a current instance of handwriting. The SPS then performs one or more actions based on the previous instances of handwriting. In one application, the SPS modifies the current instance of handwriting based on the previous instances of handwriting, such that the current instance more closely resembles the previous instances of handwriting.

A user may input the handwriting using any input device 104. The SPS 102 processes the handwriting and produces output information, which it presents on an output device. In some cases, the input device 104 is the same mechanism as the output device. For example, the input device 104 may correspond to a computer device of any type having a touch-sensitive display surface. For instance, the computer device may correspond to a personal computer, a lap-top computer, a tablet-type computer, a smartphone, and so on. The user may create marks on the touch-sensitive display surface using a stylus, finger, or other writing implement. In these cases, the SPS 102 may also present output information on the same touch-sensitive display surface. For example, the SPS 102 may present a beautified version of the input handwriting on the same touch-sensitive display surface that is used to enter the input handwriting.

In another case, the input device 104 and the output device may correspond to separate mechanisms. For example, the input device 104 may correspond to a digitizing pad (also referred to as a graphics tablet). The output device may correspond to a display device that is separate from the digitizing pad. A user may use any writing implement to make marks on the digitizing pad, while observing the resultant handwriting that is presented on the display device.

The SPS 102 itself can be implemented in any manner. For example, the SPS 102 can correspond to module within the input device 104, implemented using software, hardware, etc., or any combination thereof. In another case, the SPS 102 can be implemented by a computer device that is separate from the input device 104. Section F provides further details regarding various physical implementations of the SPS 102.

The SPS 102 includes (or can be conceptualized as including) different sub-modules which perform different functions. For instance, a token formation module (TFM) 106 receives input stroke samples that make up handwriting produced by the user. The TFM 106 can then optionally resample the input stroke samples to produce resampled stroke samples. The TFM 106 can then define, as the user produces handwriting, a succession of tokens based on the resampled stroke samples. A token corresponds to a series of n consecutive (temporally adjacent) stroke samples. Without limitation, for example, a token may correspond to 31 resampled stroke samples that collectively describe a few handwritten characters. A "new token," as the term is used herein, refers to a most recent token that is defined by the TFM 106. Section B provides further illustrative details regarding the operation of the TFM 106.

A data store 108 stores a plurality of previous tokens. Each previous token corresponds to a token that was previously defined by the TFM 106 (with respect to the new token that is the most recent token defined by the TFM 106). As will be set forth in greater detail below, the data store 108 can maintain the previous tokens as a plurality of clusters. Each cluster includes a set of similar previous tokens. Two tokens are similar when they possess similar stroke samples, and thus, on a whole, likely pertain to the same semantic content (e.g., the same characters, pictures, etc.). Each cluster is associated with a cluster representative, such as a cluster mean. As will be described below, a cluster mean of a cluster corresponds to a token that represents the average of the tokens in the cluster.

A similarity assessment module (SAM) 110 examines the previous tokens in the data store 108 to determine whether there are previous tokens that are similar to the new token. In one implementation, the SAM 110 can perform this task by determining whether there are any cluster representatives (e.g., cluster means) which are similar to the new token.

Although not shown in FIG. 1, the SPS 102 can also include a cluster management module. The cluster management module adds the new token to the cluster which is most similar to the new token. If there is no cluster that is suitably similar to the new token, then the cluster management module can create a new cluster. The new cluster will initially contain only one member, corresponding to the new token. Section C provides further illustrative details regarding the operation of the SAM 110 and the cluster management module.

A token refinement module (TRM) 112 modifies the appearance of the new token based on the similar previous tokens (if any) which have been identified by the SAM 110. The TRM 112 can perform this task by first aligning the samples in the previous token(s) with the samples in the new token. This produces correlated samples. The TRM 112 can then average the correlated samples together. Less formally stated, the TRM 112 produces a modified new token that is a blend of the original new token and the previous token(s). Hence, the TRM 112 implicitly treats the previous similar tokens as evidence of the characters and/or shapes that the user intended to create with respect to the new token. Section D provides further illustrative details regarding the operation of the TRM 112.

FIG. 1 also indicates that the SPS 102 can provide optional other applications 114, that is, instead of, or in addition to, the TRM 112. For example, without limitation, the SPS 102 can include search functionality and auto-completion functionality. Section E provides further illustrative details regarding these two applications.

Figure 2:
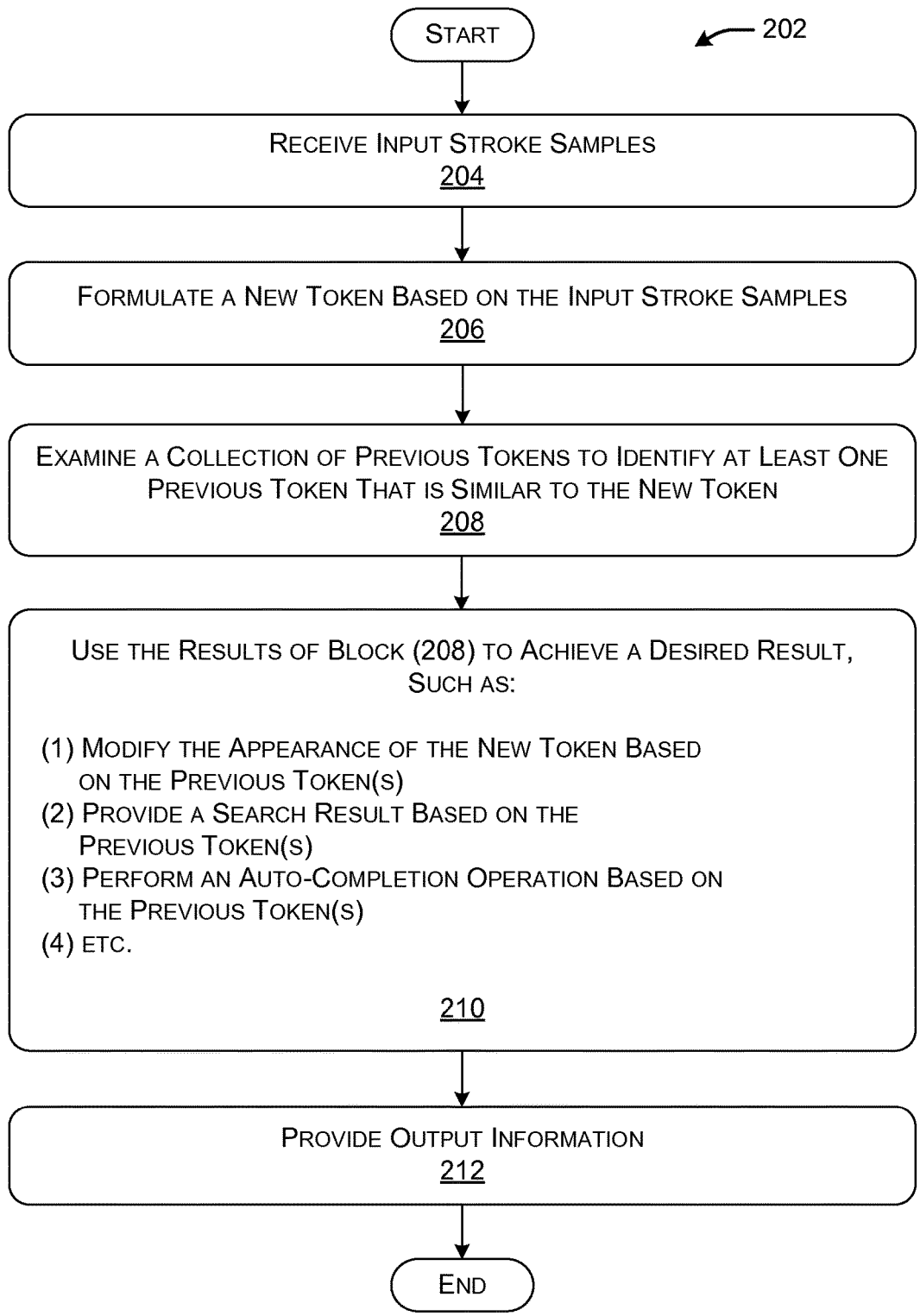
FIG. 2 is a flowchart that shows one manner of operation of the SPS of FIG. 1.

FIG. 2 shows a procedure 202 that provides an overview of one manner of operation of the SPS 102 of FIG. 1. In block 204, the SPS 102 receives input stroke samples. In block 206, the SPS 102 forms a new token based on the input stroke samples (after optionally performing a resampling operation). In block 208, the SPS 102 examines a collection of previous tokens to determine at least one previous token (if any) that is similar to the new token. In block 210, the SPS 210 performs one or more actions based on the results of block 208. For example, the SPS 102 can perform a token refinement operation in which the new token is beautified based on the previous tokens. Or the SPS 102 can perform a search operation, an auto-complete operation, etc. In block 212, the SPS 102 provides output information which conveys a result of the processing performed in block 210.

Figure 3:
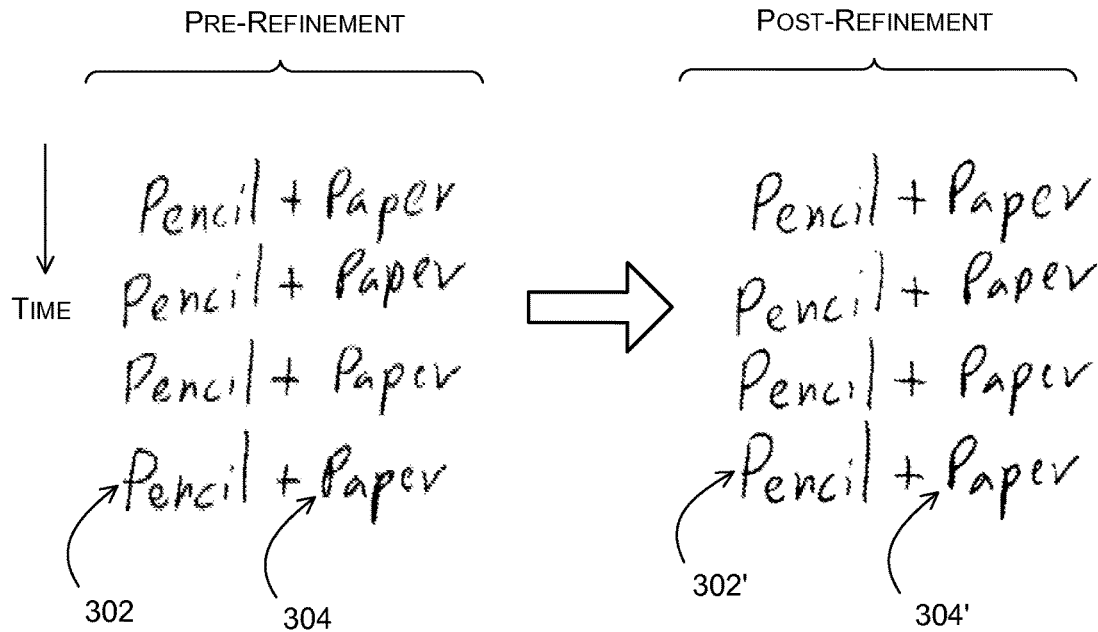
FIGS. 3-5 show examples of the operation of the SPS of FIG. 1. In this case, the SPS is applied to transform input handwriting into output handwriting, where the output handwriting represents a beautified version of the input handwriting.
Figure 4:
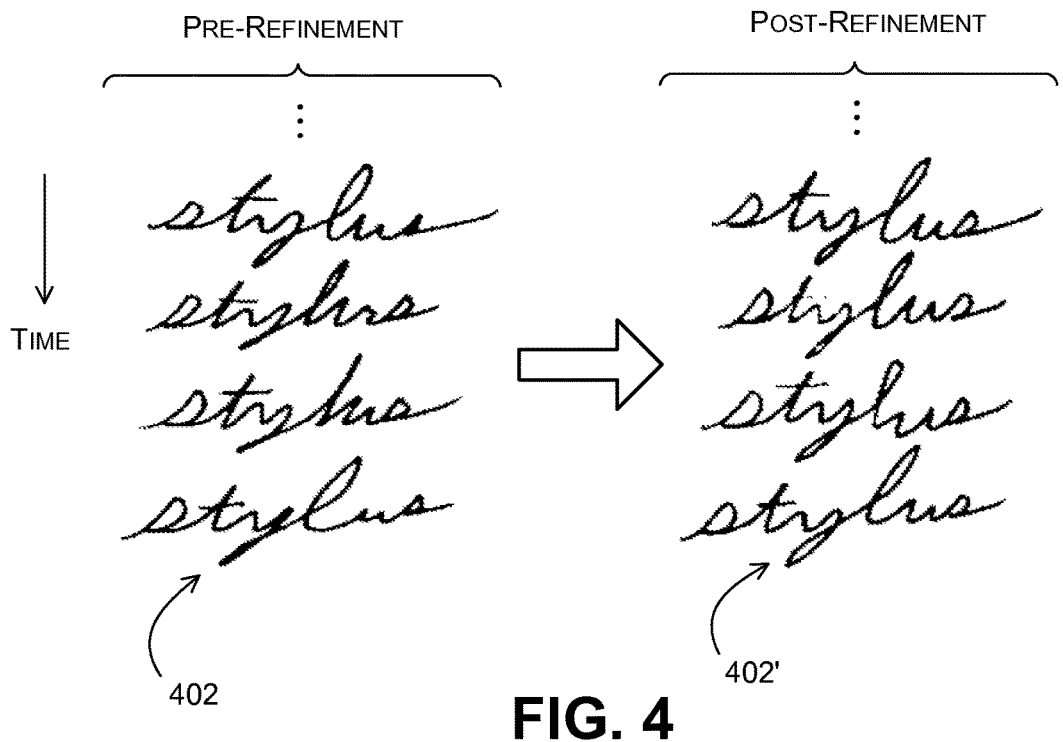
Figure 5:
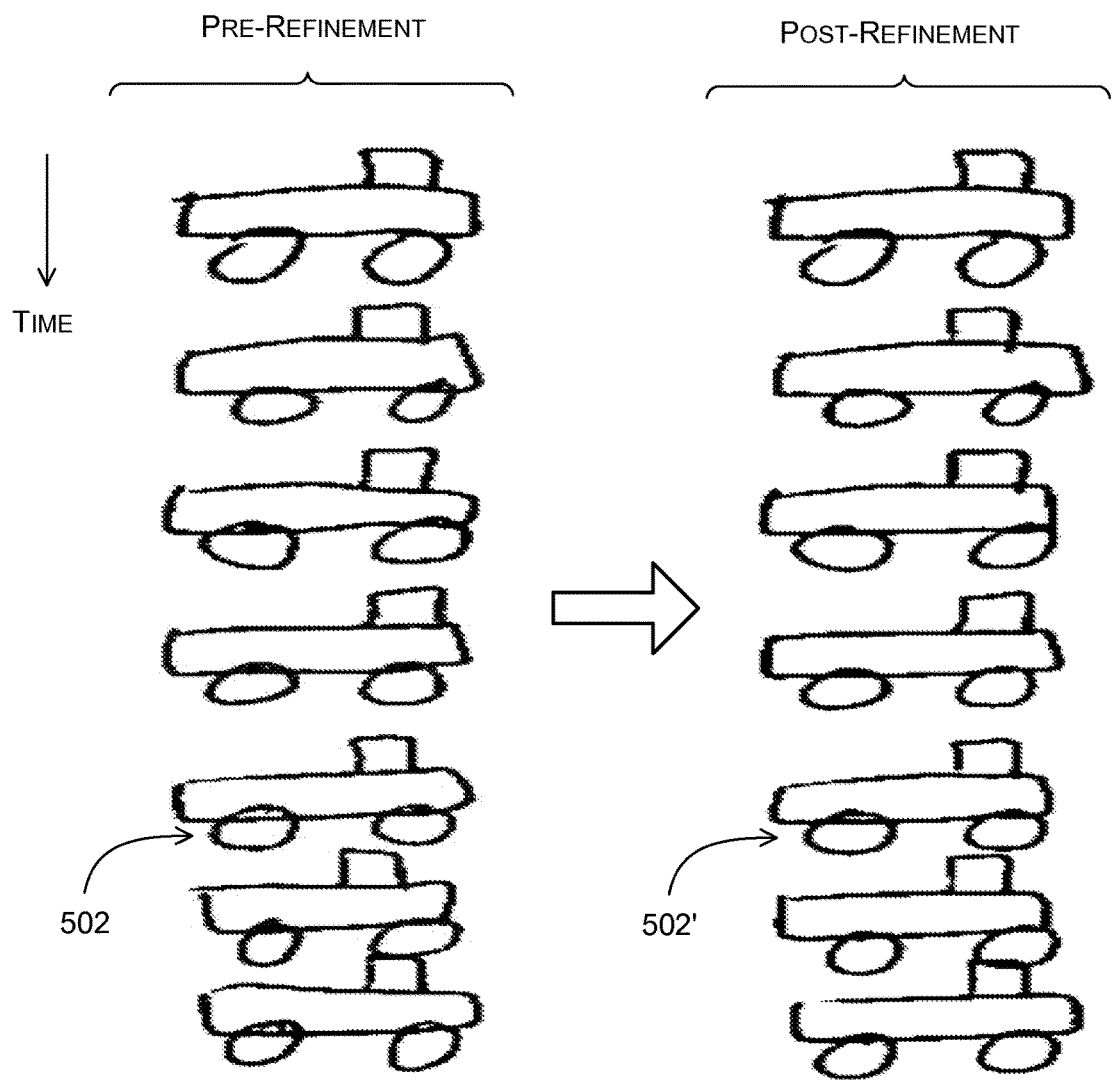

FIGS. 3-5 provide examples of the use of the SPS 102 to beautify handwriting. Each figure includes two columns. The first column (labeled "pre-refinement") includes a series of original instances of handwriting created by a user, prior to the application of refinement. The second column (labeled "post-refinement") includes a series of beautified instances of handwriting produced by the SPS 102. That is, each instance of beautified handwriting in the second column is a beautified counterpart of an adjacent original instance of handwriting in the first column.

First consider the case of FIG. 3. Here, the pre-refinement column includes a series of instances of the same phrase, "Pencil+Paper," produced by the user in top to bottom order. That is, the topmost instance of "Pencil+Paper" represents the first instance of the phrase produced by the user, while the bottommost instance of "Paper+Paper" represents the last instance of this phrase produced by the user. The post-refinement column shows a series of counterpart phrases produced by the SPS 102, following application of refinement.

Note that, as the user repeats the phrase "Pencil+Paper," the SPS 102 accumulates a knowledge base from which it can assess the typical manner in which this phrase is written by the user. The SPS 102 can leverage this knowledge by correcting the appearance of new instances of the phrase "Pencil+Paper" produced by the user, such that they more closely conform to previous instances of that phrase. For example, note that the fourth instance of the original phrase has two anomalies (302, 304) (assessed relative to the previous instances). For the anomaly 302, the curved line segment of the character "P" of "Pencil" has a tail that overshoots the vertical straight line segment of the character "P". For the anomaly 304, the straight line segment of the "P" in "Paper" flares out to produce a loop. The SPS 102 produces corrections 302' and 304' based on previous instances of "Paper+Pencil" which do not contain these anomalies. For example, in correction 302', the SPS 102 removes the tail which overshoots the straight line segment. In correction 304', the SPS 102 collapses the loop associated with anomaly 304.

The SPS 102 can display the beautified instances in relation to the original instances in any manner. In one case, the SPS 102 can overwrite the original instances with their beautified counterparts, once the beautified counterparts are calculated. For example, the SPS 102 can replace the original instances of the phrase "Pencil+Paper" with the beautified counterparts of these phrases, once they are calculated. The SPS 102 can also use various temporal blending strategies to achieve this effect, such as by gradually morphing the original instances into the beautified instances as the user writes. The user may perceive this effect as a refinement window which trails his or her handwriting, in which the user's original handwriting is gradually morphed into the beautified handwriting.

The SPS 102 can also adjust the position of the beautified instances so that they line up with the preceding writing, to thereby prevent the beautified writing from drifting away from the preceding writing. The SPS 102 can perform this task by computing an average position of the original instances, and an average position of the beautified instances. The SPS 102 can then shift the beautified instances by the difference between the two averages.

In another implementation, the SPS 102 can write the beautified instances on the output device without removing the original instances, such as by displaying the beautified instances beneath the original instances, or to the right of the original instances (as shown in FIG. 3), or to the left of the original instances, or in a selectable pop-up window, or in any other relation with respect to the original instances. Still other presentation strategies are possible. The SPS 102 can also give the user an "undo" option, which allows the user to remove the effects of beautification.

Further note that, in the above examples, the SPS 102 operates on a moving window of immediately-preceding new handwriting based on a more encompassing corpus of past handwriting. The SPS 102 does not operate to correct instances of past handwriting which occur prior to that window. This means that, after the window moves on, the handwriting that appears in "back" of the window becomes fixed (meaning that it is no longer subject to beautification). But it is also possible to modify handwriting in back of this window. For example, in another implementation, the user may instruct the SPS 102 to make a global correction of handwriting in a document that is already produced based on the complete corpus of previous handwriting expressed in the document and elsewhere.

FIG. 4 shows another example in which the SPS 102 refines original instances of handwriting to produce beautified instances of handwriting. Here, the user successively writes the word "stylus," as indicated in the pre-refinement column (where only the last four entries are shown). The SPS 102 modifies these original instances into beautified instances of the word "stylus," as indicated in the post-refinement column (where, again, only the last four entries are shown). For example, consider an anomaly 402 in an original instance of the word "stylus," corresponding to the case in which a user produces the distended segment of the letter "y" as a single line. Assume that this is an anomaly insofar as the user typically writes this segment as a loop, not as a single line; note, however, that this is not evident from the limited number of samples shown in FIG. 4. In response to this finding, the SPS 102 can replace the anomaly 402 with its correction 402'.

FIGS. 3 and 4 correspond to the case in which the handwriting corresponds to alphanumeric characters. But, more generally, the SPS 102 performs analysis in a manner which is agnostic to the nature of the user's handwriting. In other words, the SPS 102 can beautify any marks that resemble previous-input marks. Those marks can correspond to repetitive symbols in any language, repetitive pictures, or repetitive makings having no meaning whatsoever.

For instance, FIG. 5 shows an example in which a user produces a series of crude pictures of a vehicle, as shown in the pre-refinement column. Once the SPS 102 accumulates previous tokens associated with this picture, the SPS 102 can produce beautified counterpart instances of the pictures, as shown in the post-refinement column. For example, note that one such original instance includes an anomaly 502 in which a tire overlaps the body of the vehicle to a greater extent compared to previous pictures of the vehicle. The SPS 102 produces a correction 502' which reduces the extent of this anomaly. Note that the SPS 102 does not entirely correct the anomaly, in that the tire still overlaps the body of the vehicle to some extent. This is because the anomaly 502 in the original picture was large enough so that it could not be completely "corrected" by the previous instances of the picture. This, in turn, stems from the fact that the beautified drawing represents an average of the original instance of the picture (which contains the anomaly) and the previous instances of the pictures (which omit the anomaly to varying extents).

As a general characteristic, note that the SPS 102 operates by correcting the user's handwriting based on previous instances of the same user's handwriting. Thus, the corrections that the SPS 102 makes generally conform to the writing style of the user, rather than some canonical template defining what constitutes a "correct" form of a character or geometrical shape. For example, if the user repetitively forms a character in an idiosyncratic way, then the SPS will not regard this character as anomalous, and thus will not correct it. In one implementation, the data store 108 can store the user's previous tokens over the course of any number of prior sessions, corresponding to any length of time (e.g., days, months, years, etc.), and any number of documents produced by the user. The SPS 102 can also optionally weight each token based on its time of creation, giving more weight to more recent tokens.

In another implementation, the SPS 102 can rely on a data store that contains tokens produced by plural users. Such a data store may be regarded as a user-agnostic token collection. In another implementation, the SPS 102 can rely on the user-agnostic token collection only to the extent that it has not yet accumulated sufficient knowledge of a particular user's handwriting style. For example, the SPS 102 can use the user-agnostic token collection almost exclusively when an individual user first begins to use the SPS 102. The SPS 102 can thereafter reduce its reliance on the user-agnostic token collection in proportion to the current size of the user's personal token collection.

In another implementation, the SPS 102 can store multiple versions of user-agnostic token collections, each corresponding to a particular writing style. The SPS 102 can classify the user based on his or her writing style, and then use whatever user-agnostic token collection is appropriate for that style. Still other implementations are possible.

However, to simplify and facilitate explanation, the remainder of this description will assume that the data store 108 stores a collection of previous tokens produced by the handwriting of a particular user, for use in beautifying the handwriting of that user.

B. Token Formation Module

Figure 6:
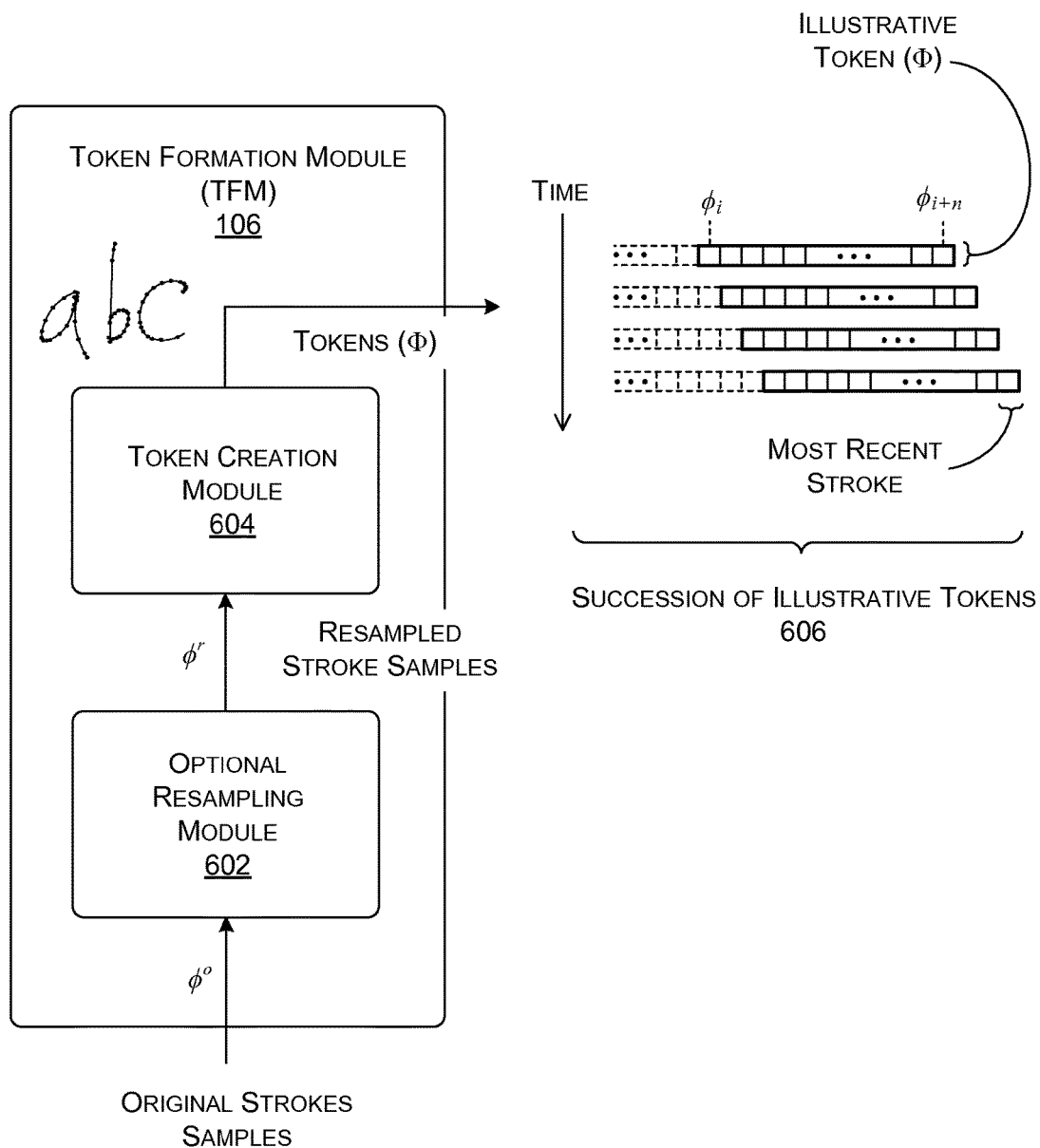
FIG. 6 shows one implementation of a token formation module, which is a component of the SPS shown in FIG. 1. A token corresponds to a series of temporally adjacent stroke samples that make up part of a user's handwriting.

FIG. 6 shows one implementation of the TFM 106. The TFM 106 includes an optional resampling module 602 and a token creation module 604. The token resampling module 602 receives original stroke samples that have been created using any sampling technique. Each original stroke sample is denoted herein as $\varphi^o$. The token resampling module 602 then generates another representation of the handwriting, yielding resampled stroke samples. Each resampled stroke sample is denoted herein as $\varphi^r$. The token creation module 604 produces a series of tokens 606 over the course of time based on the resampled stroke samples. Each token is denoted herein as $\Phi$.

More specifically, in one case, the resampling module 602 can produce a resampled version of the handwriting in which the rate at which samples are produced directly varies with the curvature of the handwriting. This means that the resampling module 602 can represent a relatively straight line segment with fewer sample points compared to a curved line segment.

In one implementation, the token creation module 604 produces a new token ($\Phi$) each time the resampling module 602 provides a new stroke sample ($\varphi^r$). For example, assume that the token creation module 604 defines a new token as a succession of n samples, that is, $\Phi=\{\varphi_1^r, \ldots, \varphi_n^r\}$, where, in one case, n=31. When the token creation module 604 receives the next stroke sample ($\varphi^r$), it creates a new token having n samples. The new token is the same as the immediately previous token, except that it is shifted by one sample position relative to the previous token. In other words, if n=31, the new token shares 30 samples in common with the previous token. FIG. 6 pictorially illustrates the above-described overlapping nature of the tokens 606.

The token size is selected to accommodate the formation of meaningful clusters. If the token size is too large, such that it encompasses an entire word (e.g., the word "mountain"), then the SPS 102 will not be able to quickly form a cluster for this token, since a user can be expected to infrequently write this word. And if the token size is too small (such that it encompasses just a single character), then the token will not capture contextual information that reflects how it is combined with other tokens. For example, the way that a user writes the character "a" will differ depending on the characters which precede and follow the character "a." Choosing the token size large enough to encompass a few characters (e.g., 2-3 characters) provides a satisfactory solution in many implementations. For example, while the word "mountain" occurs infrequently, the character combination "oun" occurs quite often. More generally, the token creation module 604 can be configured to produce tokens of any size, depending on any environment-specific factor(s).

Figure 7:
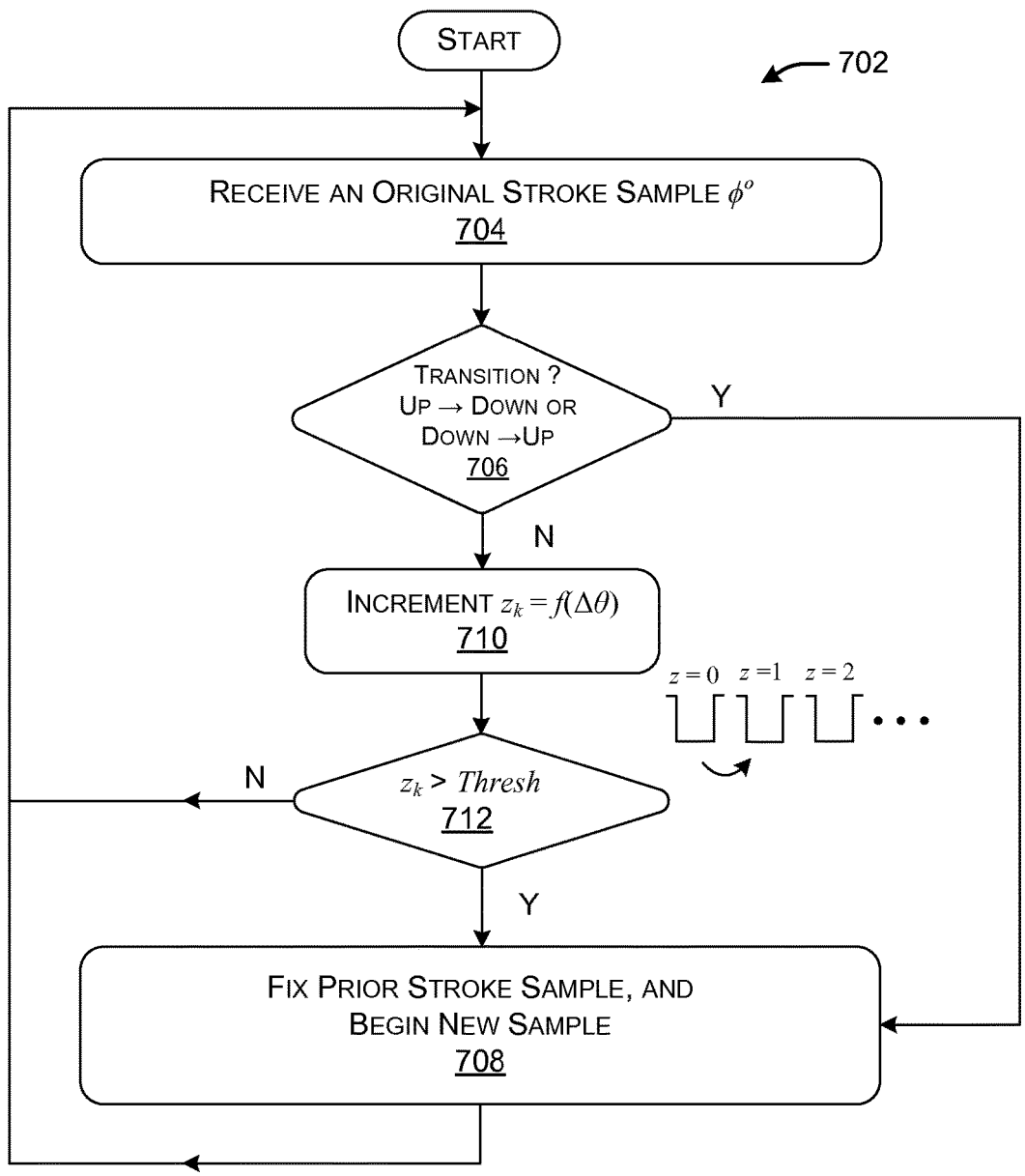
FIG. 7 is a flowchart that shows one manner of operation of the token formation module of FIG. 6.

FIG. 7 shows a procedure 702 which represents one manner of operation of the resampling module 602. This procedure 702 is described by way of illustration, not limitation; other implementations can adopt other resampling strategies. In this case, it is assume that both the original and resampled stroke samples are represented in polar coordinates. That is, each sample is defined by three values (r, $\theta$, p), where r is a magnitude value which indicates a length of a line segment, $\theta$ is an angle value which indicates an orientation of the line segment with respect to some global reference frame, and p is the pressure of the stylus (or other writing implement) on the surface of the input device 104. A pressure of zero indicates that the stylus is not in contact with the writing surface of the input device 104.

By way of overview, the resampling module 602 assigns original stroke samples to "buckets," where each bucket corresponds to a particular resampled stroke sample. More specifically, the resampling module 602 operates to add original stroke samples to a bucket until a curvature-based value associated with the bucket exceeds some threshold. When this happens, the resampling module 602 will advance to the next bucket in the sequence of buckets. In this manner, the resampling module 602 will "fill" more buckets for curved lines, compared to straight lines.

More specifically, in block 704, the resampling module 602 receives a new original stroke sample $\varphi^o$. In block 706, the resampling module 602 determines whether the new original stroke sample $\varphi^o$, relative to the preceding original stroke sample, indicates that a user has placed the stylus onto the writing surface of the input device 104, or removed the stylus from the writing surface. If so, then, in block 708, the resampling module 602 produces a new resampled stroke sample $\varphi^r$. The resampling module 602 also "fixes" the previous resampled stroke sample (if any) that it was previously creating; this means that the resampling module 602 will stop adding original stroke samples to that previous "bucket."

In block 710, assume that the new original stroke sample corresponds to a mark that a user has produced on the writing surface. Expressed in polar coordinates, assume that the mark has a length $r_k$, an orientation $\theta_k$, and a pressure $p_k$. The resampling module 602 increments a variable value $z_k$ based on a change in orientation ($\vartheta_k$) of the current original stroke sample relative to the previous original stroke sample. That is, $z_k$ is some function of $\vartheta_k$, where $\vartheta_k = \Delta_\theta(k-1, k)$, where $\Delta_\theta(a,b) = \min(|\theta_a - \theta_b|, 2\pi - |\theta_a - \theta_b|)$.

In block 712, the resampling module 602 determines whether the value of $z_k$ exceeds some threshold. For example, assume that the resampling module 602 creates a bucket for values of $z_k$ from 0 up to 1.0, and another bucket for values of $z_k$ from 1.0 up to 2.0, and so on. In this case, in block 712, the resampling module 712 can determine whether the value of $z_k$ has moved into the next integer bucket.

If the threshold has not been exceeded, the resampling module 602 can add the new original stroke sample to the existing resampled stroke sample being created in the current "bucket." Assume that the accumulated line segment in the current bucket has a magnitude value $r_l$, an orientation $\theta_l$, and a pressure $p_l$. The resampling module can update the new Cartesian endpoints (x, y) of the resampled stroke sample as $x = r_k \cos(\theta_k) + r_l \cos(\theta_l)$ and $y = r_k \sin(\theta_k) + r_l \sin(\theta_l)$. The resampling module 602 can update the new pressure of the accumulated resampled stroke sample as $p_j = (r_k * p_k + r_l * p_l)/(r_k + r_l)$. The updated magnitude of the resampled stroke sample (after adding the new sample) corresponds to $r_j = \|x, y\|$. The updated orientation of the resampled stroke sample corresponds to $\theta_j = \arctan(y,x)$.

In block 708, alternatively assume that adding the current original stroke sample to the current bucket causes the value of $z_k$ to exceed the threshold. In response, the resampling module 602 creates a new bucket (corresponding to a new resampled stroke sample) and adds the original stroke sample as a first entry to the new bucket. At this point, the previous bucket (corresponding to the previous resamples stroke sample) becomes fixed, and the resampling module 602 adds future received original stroke samples to the new bucket.

Any function $f(\vartheta_k)$ can be used to compute $z_k$. Without limitation, in one example, the resampling module 602 uses the following equation to compute $z_k$:

$$z_k = z_{k-1} + \min(1, \alpha\beta_l \vartheta_k).$$

Using this equation, the resampling module 602 produces a new value $z_k$ by adding the smaller of 1 and $\alpha\beta_l \vartheta_k$ to the previous value of $z_k$ (i.e., $z_{k-1}$). The value of 1 ensures that the resampling module 602 increases the value of $z_k$ by no more than 1, which prevents the procedure 702 from skipping over a bucket, and which correspondingly prevents the token that is created from having entries with zero-length magnitudes. The parameter $\alpha$ controls the density of sampling. Without limitation, $\alpha$ can be set as $12/\pi$, which will roughly produce 24 samples for a drawn circle. The parameter $\beta_l$ prevents errors that would otherwise be caused by the discretization of the stylus position, that is, by reducing the values of z when the stroke magnitude $r_l$ is currently small, where $r_l$ corresponds to the length of the line segment to which $r_k$ is being added. Without limitation, in one case, the resampling module 602 can compute the parameter $\beta_l$ as $\max(0, \min(1, r_l-\sqrt{2}))$.

Figure 8:
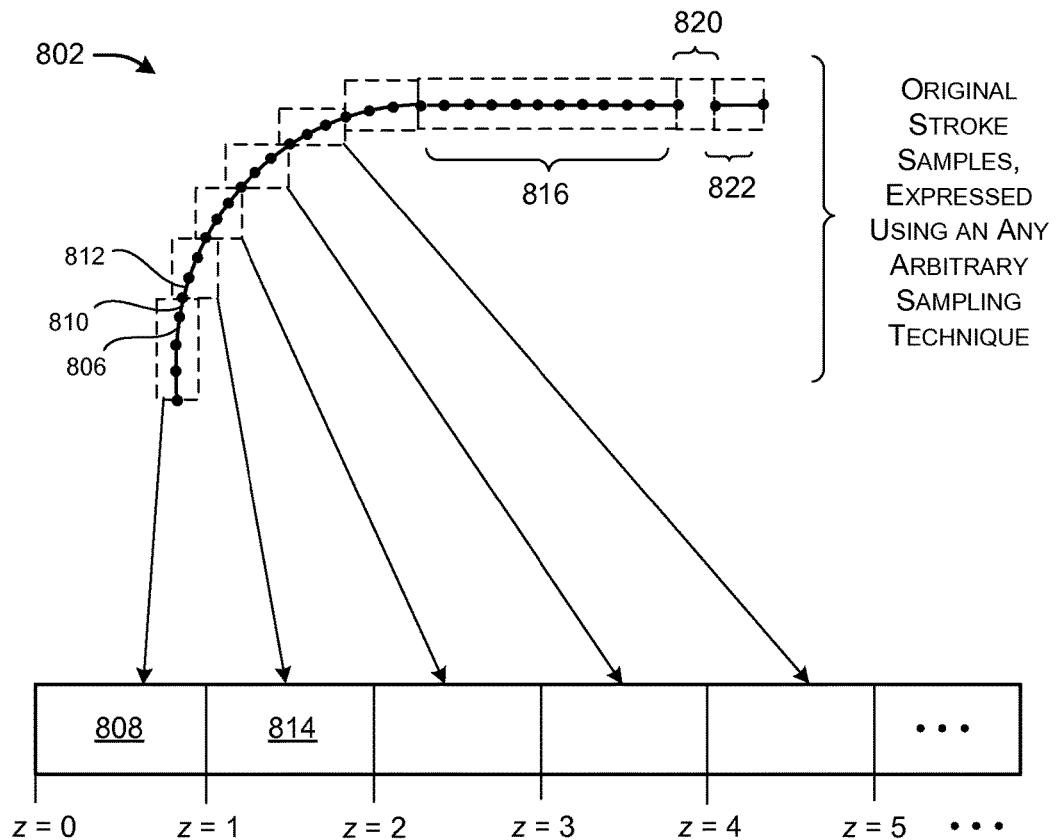
FIG. 8 shows an example of a resampling operation that may be performed by the token formation module of FIG. 7.
Figure 8:
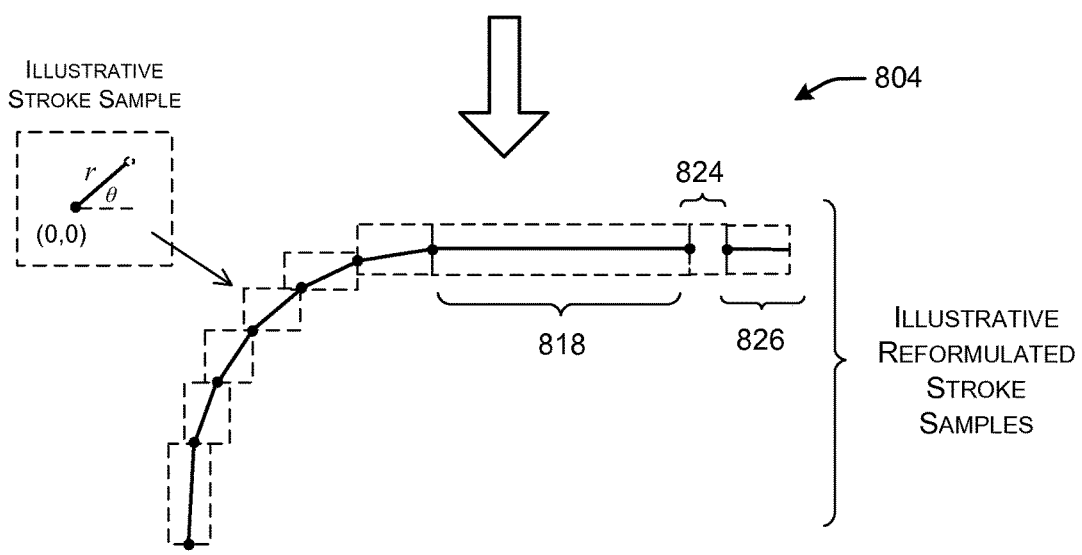

FIG. 8 shows an example which clarifies the operation of the procedure 702 of FIG. 7. The figure shows original handwriting 802 that is composed of a plurality of original stroke samples. Each original stroke sample is demarcated by a beginning sample point and an ending sample point (where each sample point is denoted in FIG. 7 as a black dot). The beginning sample point is the same as the ending sample point of the preceding sample (if any). The resampling module 602 converts the original handwriting 802 into resampled handwriting 804. The resampled handwriting 804 is likewise composed of a plurality of resampled stroke samples, each of which is denoted by a beginning sample point and ending sample point.

Based on the procedure 702, the resampling module 602 performs resampling based on the degree of curvature in the original handwriting 802. More specifically, the resampling module 602 advances to a new bucket when the value $z_k$ exceeds a threshold, such as when the value $z_k$ exceeds an integer value associated with a current bucket. For example, the resampling module 602 adds an original stroke sample 806 to the first bucket 808 without exceeding the threshold of the first bucket (which, in this case, is 1.0). The resampling module 602 then adds another original stroke sample 810 to the first bucket 808, again without exceeding the threshold. But then assume that the resampling module 602 discovers that, by adding another stroke sample 812 to the first bucket 808, it will exceed the threshold. In response, the resampling module 602 adds the stroke sample 812 as a first entry of the second bucket 814. This procedure continues in the above-described manner, processing the original stroke samples in piecemeal fashion as the user produces the original handwriting 802.

Upon reaching the straight line portion 816 of the original handwriting 802, the resampling module 602 will discover that it can fit a relatively large number of original stroke samples into a single bucket. As a result, the resampled handwriting 804 can devote a single resampled stroke sample 818 to the straight line portion 816 of the original handwriting 802.

Next assume that, at juncture 820 in the original handwriting, the user lifts the stylus off of the writing surface of the input device 104. Then assume that, at juncture 822, the user again applies the stylus to the writing surface. The resampling module 602 initiates the creation of a new resampled stroke sample for both of these events, as indicated by the resampled stroke samples 824 and 826 which appear in the resampled handwriting 804. Further note that the resampling module 602 does not increment any bucket when a user's stylus is not in contact with the writing surface.

The resampling module 602 can use curvature-based resampling to efficiently represent handwriting. For example, the resampled handwriting 804 includes fewer strokes samples compared to the original handwriting 802. By comparison, consider a constant-distance sampling technique, in which the resampling module 602 would create a new stroke sample for every fixed distance d traversed by the original handwriting 802. Had the resampling module 602 used this technique, it would have created more resampled stroke samples compared to the above-described curvature-based resampling technique (depending, that is, on the value of d).

Figure 9:
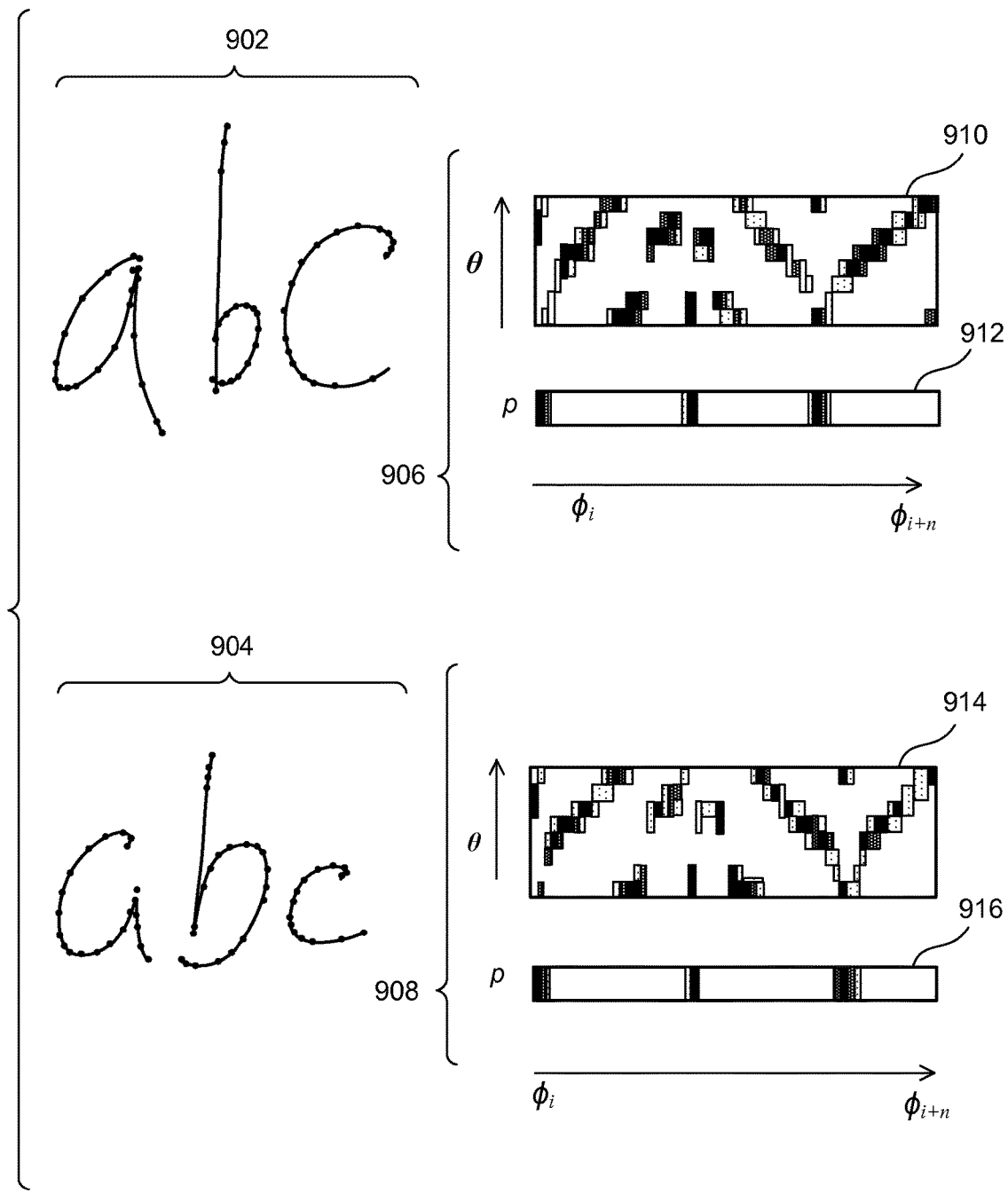
FIG. 9 shows an example of two token descriptors that may be produced by the token formation module of FIG. 7. Each token descriptor describes a token.

FIG. 9 conveys another advantage of the use of curvature-based resampling. Here, the TFM 106 produces resampled stroke samples to express a first token 902 and a second token 904. The tokens (902, 904) represent different instances of the characters "abc." That is, while the tokens (902, 904) express the same characters from a high-level semantic standpoint, the characters also vary from each other in various ways from a graphical standpoint. The TFM 106 can more effectively capture the similarity between the two tokens (902, 904) using curvature-based resampling compared to, for instance, constant-distance resampling. This makes it more likely that stroke samples in the first token 902 will match up with stroke samples in the second token 904 (e.g., such that $x^{th}$ stroke sample in the first token 902 will match up with the $x^{th}$ stroke sample in the second token 904).

Moreover, to further reduce the difference between the tokens (902, 904), the TFM 106 can normalize their stroke magnitudes. This reduces the variation in scale between the tokens (902, 904), e.g., such that a large version of the characters "abc" can be effectively compared with a smaller version of the characters "abc." That is, the TFM 106 produces a normalized magnitude value, $\hat{r}_k$, for each sample in a token using $r_k/\eta_k$, where $\eta_{ik}$ may be computed as a Gaussian weighted running average of the stroke magnitudes in the token. In the following description, the magnitudes $r_k$ may be normalized in above-described manner, although not explicitly stated.

The similarity between the tokens (902, 904) is further evident by comparing their descriptors (906, 908). In general, a descriptor refers to a way of describing a token. In the case of FIG. 9, the SPS 102 represents each token as two histograms, such as, for the first token 902, a first histogram 910 and a second histogram 912. Both histograms (910, 912) express the samples of the first token 902 along their horizontal axes, that is, from a first sample $\varphi_i$ to a last sample $\varphi_{i+n}$. The vertical dimension of the first histogram 910 expresses the orientation ($\theta$) of each sample. The density of each data point in the first histogram 910 expresses the magnitude value (r) of a sample. Here, dark points correspond to relatively high r magnitudes. The density of each data point in the second histogram 912 expresses a pressure value (p). Here, dark points correspond to relative low pressures; for example, the darkest points indicate that the user has lifted the stylus off of the writing surface of the input device 104. (Note that FIG. 9 depicts only a few shades of density in the histograms to facilitate illustration, although, in actual practice, a histogram may express additional density gradations.) The second descriptor 908 is also composed of two histograms (914, 916) that express the same information as the histograms (910, 912) described above.

More generally, the histograms in FIG. 9 use a temporal representation to describe the tokens (902, 904). This is, each token is created in piecemeal fashion, sample by sample, as the user writes on the writing surface of the input device 104. This means that the horizontal axis of each histogram is a proxy for a succession of instances of time.

Overall, observe that the first descriptor 906 resembles the second descriptor 908. This is due, in part, to the use of curvature-based resampling to represent the handwriting. For instance, consider the alternative case in which the resampling module 602 uses constant-distance resampling to produce descriptors for the two instances of the characters "abc" shown in FIG. 9. The descriptors (not shown) for these tokens would not exhibit the same degree of correlation as is depicted in FIG. 9.

With that said, the TFM 106 can also be implemented using other types of resampling strategies besides curvature-based sampling, including constant-distance sampling strategies. Further, in those cases in which curvature-sampling is used, the resampling module 602 can use other techniques for defining the samples, besides the procedure 702 shown in FIG. 7.

C. Similarity Assessment Module

Figure 10:
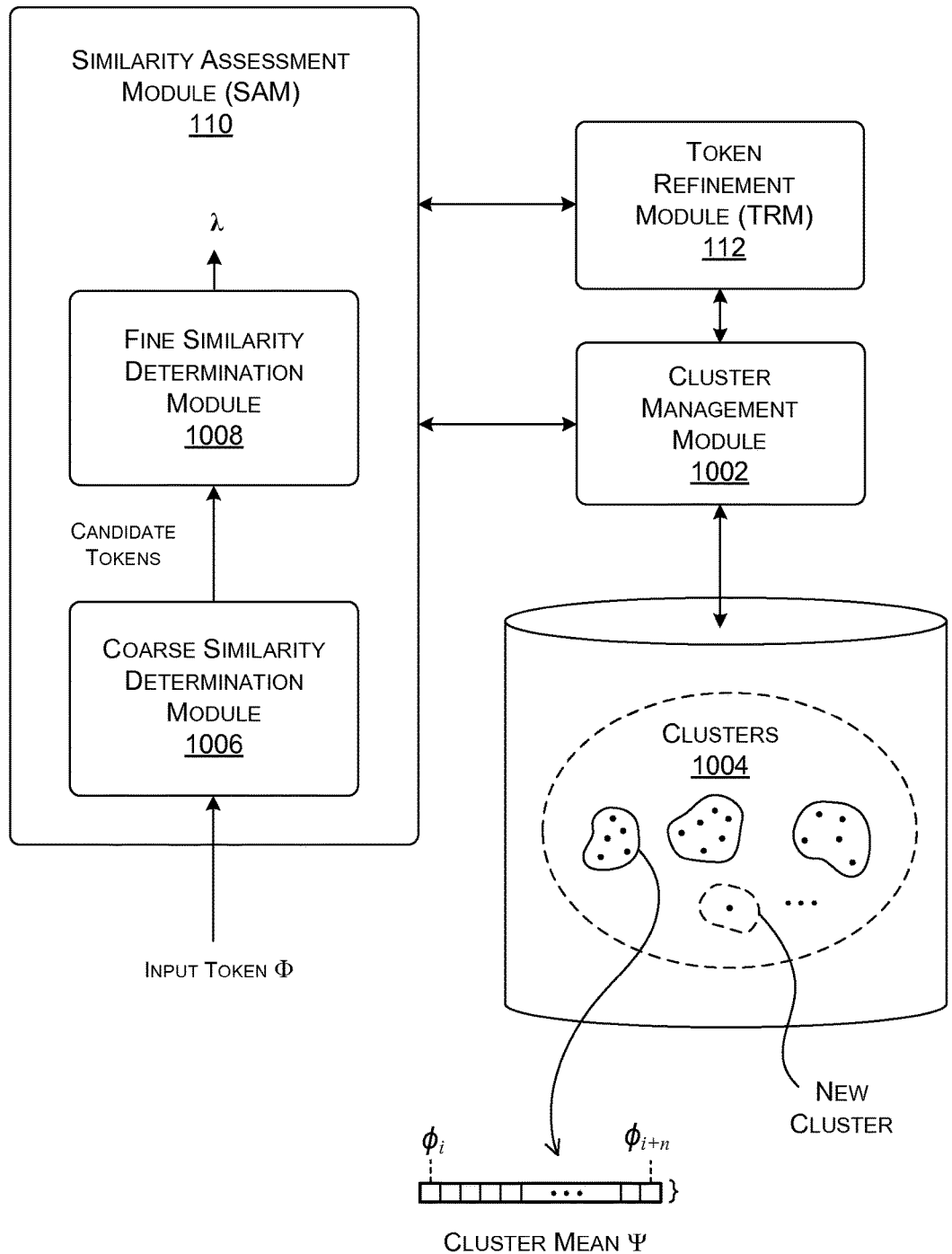
FIG. 10 shows one implementation of a similarity assessment module, which is another component of the SPS of FIG. 1.

FIG. 10 shows one implementation of the similarity assessment module (SAM) 110. As noted in Section A, the SAM 110 determines the similarity between a new token and previous tokens. A new token corresponds to a most recent token that has been defined by the TFM 106, while a previous token corresponds to a token that has been previously defined by the TFM 106. The data store 108 stores the previous tokens.

In general, the SAM 110 can compare the new token with a previous token by forming a descriptor of the new token and another descriptor of the previous token. The SAM 110 can then use any technique to compare the two descriptors. If the difference between the two descriptors is below a prescribed threshold, then the SAM 110 can conclude that the new token is similar to the previous token.

In one implementation, the SAM 110 can operate by comparing the new token with each individual token. In another implementation, a cluster management module 1002 can form clusters 1004 of tokens. Each cluster includes a set of tokens that have been previously assessed as being similar to each other. Each cluster also includes a cluster representative, such as a cluster mean $\Psi$. The cluster mean $\Psi$ represents the average of the tokens within the cluster. In this implementation, the SAM 110 operates by comparing the new token with each of the cluster representatives, instead of the individual previous tokens.

The cluster management module 1002 can also add the new token to whatever cluster that it most closely matches. The cluster management module 1002 can perform this task by updating the cluster mean to take into consideration the contribution of the new token, e.g., by averaging the cluster mean with the new token to produce a new cluster mean. Alternatively, if there is no sufficiently similar existing cluster, the cluster management module 1002 can create a new cluster. Initially, the new cluster includes a single member, corresponding to the new token.

The SAM 110 can adopt any approach to determine the similarity between two tokens (e.g., between a new token and a token mean). In one approach, the SAM 110 includes a coarse similarity determination module 1006 and a fine similarity determination module 1008. The coarse similarity determination module 1006 uses temporal analysis to make a first-level assessment of the similarity between two tokens. This temporal analysis yields a set of candidate tokens, e.g., corresponding to a candidate set of cluster means which match the new token (if any). The fine similarity determination module 1008 uses spatial analysis to verify whether each of the candidate tokens is indeed a suitable match for the new token.

Figure 11:
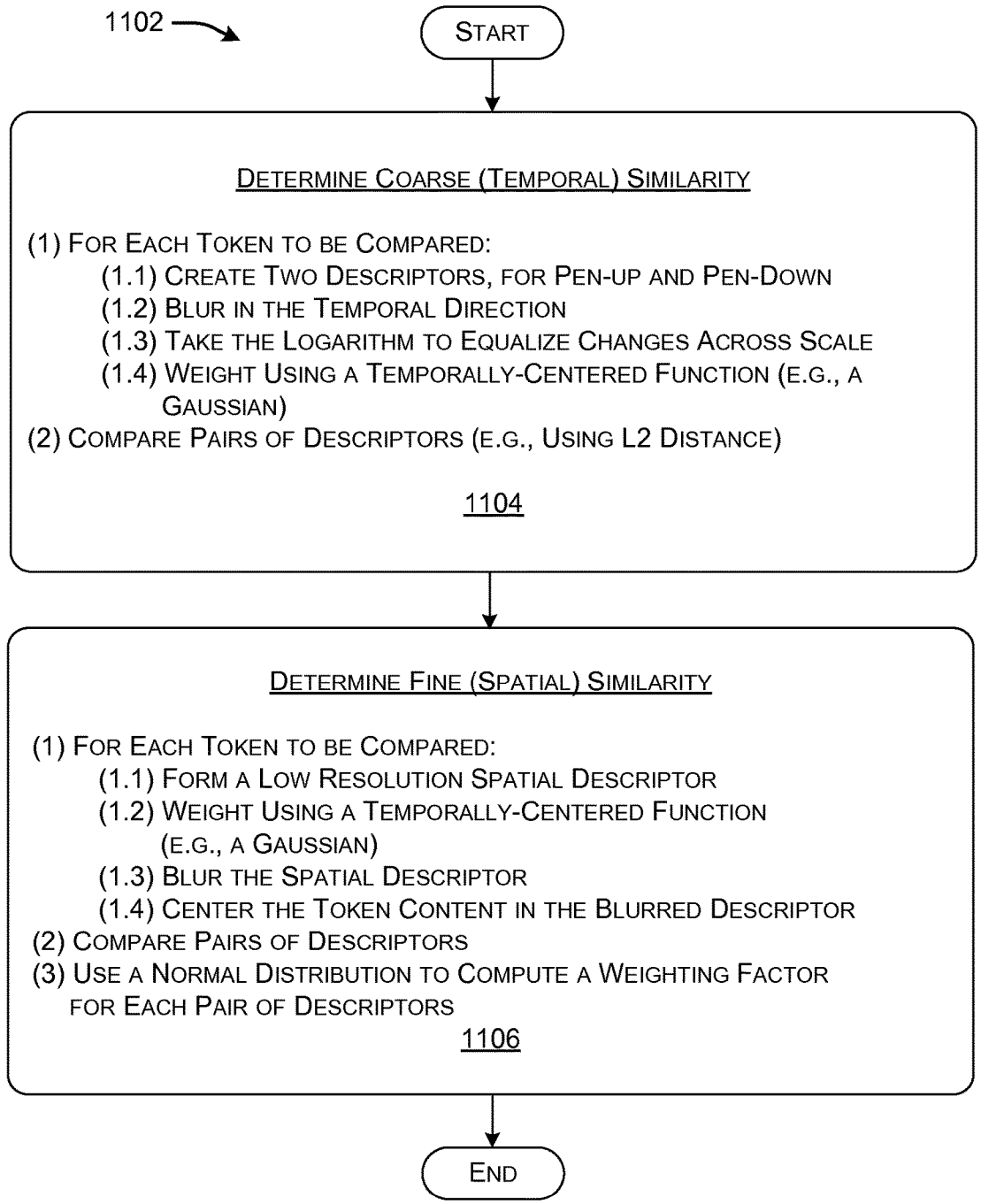
FIG. 11 is a flowchart that describes one manner of operation of the similarity assessment module of FIG. 10.

FIG. 11 shows a procedure 1102 which summarizes the operation of the SAM 110. In block 1104, the SAM 110 determines the coarse similarity between the new token and each of the previous tokens (or the cluster means), to produce a set of candidate tokens. In block 1106, the SAM 110 uses spatial analysis to verify whether each candidate token is indeed a suitable match for the new token. The individual sub-steps in blocks 1104 and 1106 will be described at a later juncture in this section.

In one implementation, the SPS 102 can perform the operations in blocks 1104 and 1106 for all similarity comparisons that it performs, including case A in which the SPS 102 uses similarity analysis to find the closest-matching cluster for the purpose for updating the clusters, and case B in which the SPS 102 uses similarity analysis to find a set of similar clusters for the purposes of beautifying a new token. In another implementation, for case A, the SPS 102 can perform block 1104, but not block 1106.

Figure 12:
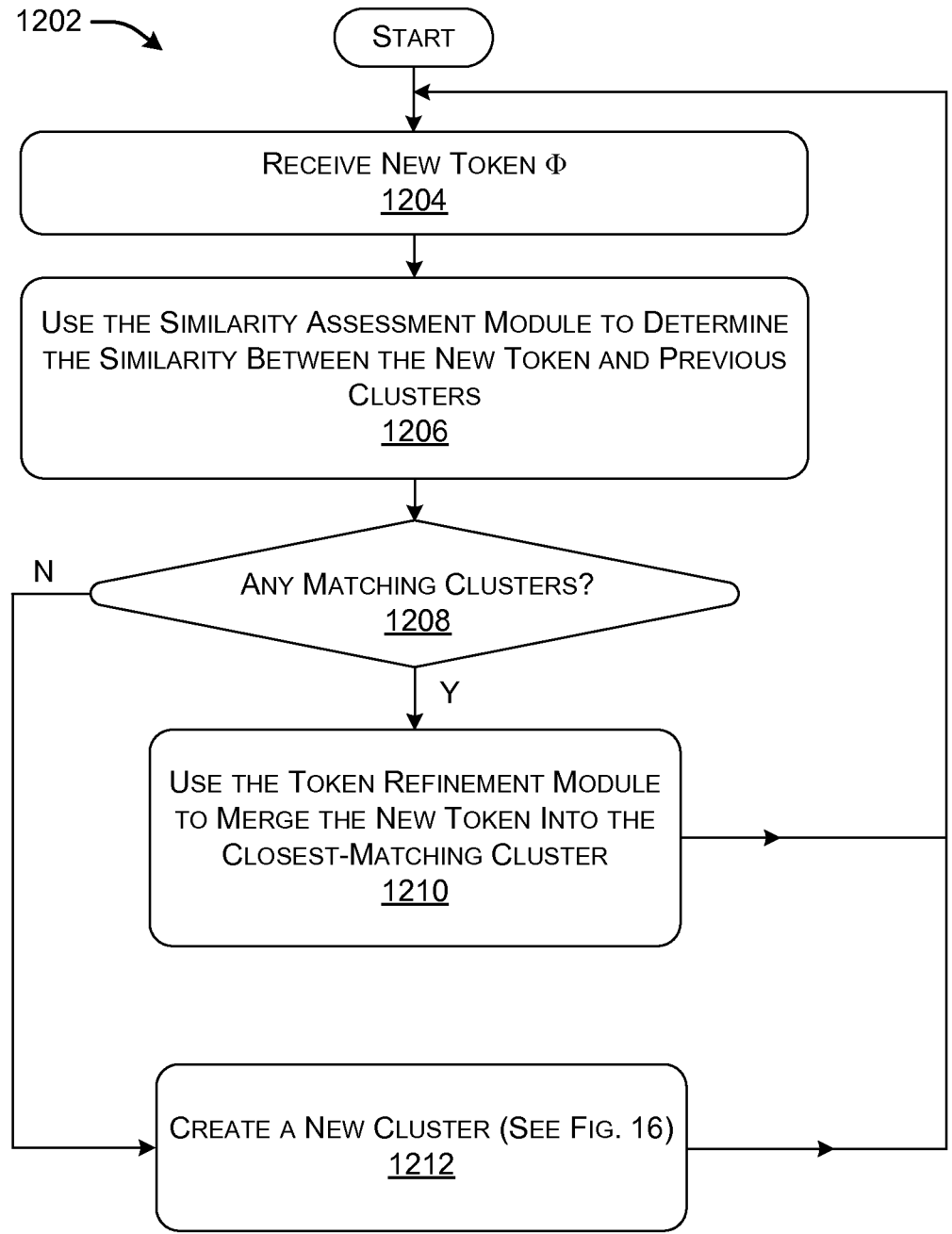
FIG. 12 is a flowchart that describes one manner of operation of a clustering module, which is another component of the SPS of FIG. 1.

FIG. 12 shows a procedure 1202 which summarizes the operation of the cluster management module 1002. In block 1204, the cluster management module 1002 receives a new token. In block 1206, the cluster management module 1002 relies on the SAM 110 to determine the similarity between the new token and the cluster representatives (e.g., the cluster means). In block 1208, the cluster management module 1002 determines whether there are any clusters which match the new token within a predetermined threshold $\tau$ (using the analysis in just block 1104, or the two-stage analysis of blocks 1104 and 1106). If there is at least one such cluster, in block 1210, the cluster management module 1002 can use the TRM 112 to merge the new token into the closest-matching cluster (in a manner described below). In another implementation, not shown, the cluster management module 1002 can potentially add the token to two or more clusters that satisfy the above similarity threshold.

Alternatively, in block 1212, assume that the cluster management module 1002 determines that no cluster is suitably similar to the new token. In that case, the cluster management module 1002 creates a new cluster to represent the new token. That new cluster initially includes one member, corresponding to the new token.

Figure 13:
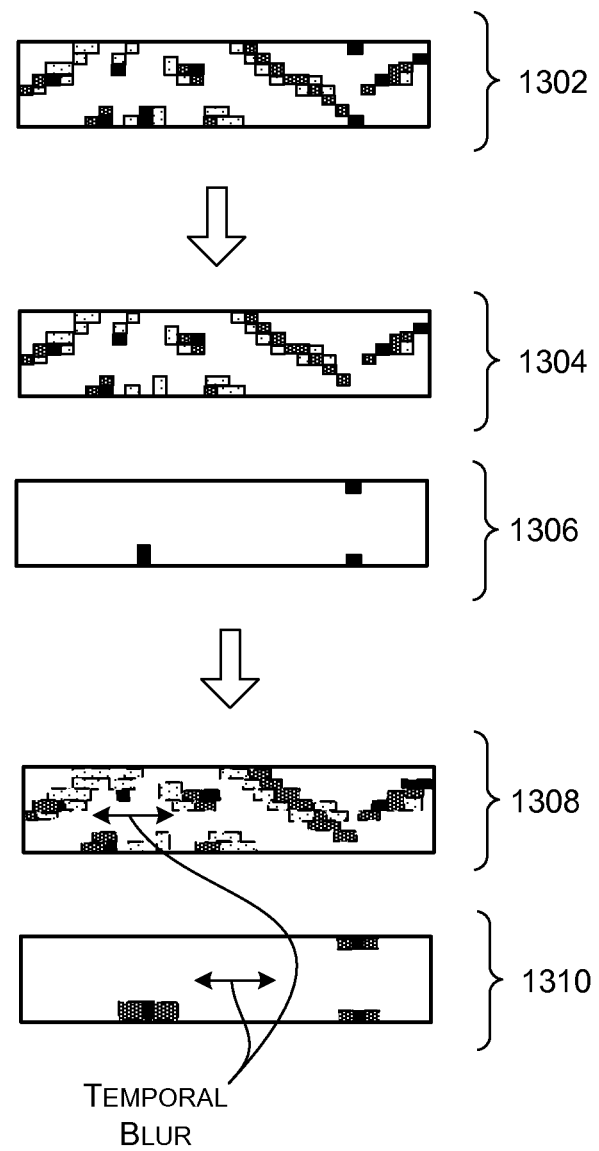
FIG. 13 is an example of temporal coarse-level similarity processing that may be performed by the similarity assessment module of FIG. 10.

Block 1104 in FIG. 11, together with the example of FIG. 13, illustrate one technique for performing coarse-level temporal analysis on each pair of tokens to be compared. The SAM 110 begins by expressing each token using a single descriptor 1302. That descriptor 1302 corresponds to the type of histogram 910 shown in FIG. 9; that is, the descriptor 1302 describes orientation ($\theta$) and magnitude (r) values as a function of samples ($\varphi$). In step (1.1) of block 1104, the SAM 110 breaks the single descriptor 1302 into two separate descriptors (1304, 1306). A first descriptor 1304 describes the stroke samples for the times when the stylus is in contact with the display surface. The second descriptor 1306 describes strokes samples for the times when the stylus is not in contact with the display surface.

In step (1.2), the SAM 110 blurs both descriptors (1304, 1306) in the temporal dimension, e.g., by modifying the values in the descriptors (1304, 1306) using a Gaussian function. This yields blurred descriptors (1308, 1310). In step (1.3), the SAM 110 takes the logarithm of the magnitudes in the blurred descriptors (1304, 1306). This operation is performed because small stroke samples may be as visually salient as large stroke samples; this operation helps equalizes changes across scale. In step (1.4), the SAM 110 weights the results of step (1.3) by a temporally centered Gaussian. The resultant processed pen-down and pen-up descriptors may then be combined to form a single vector.

The SAM 110 performs the above described operations on each token to be compared. More specifically, consider the case in which a new token is being compared with a cluster mean. The SAM 110 performs the above-described processing on the new token and, separately, on the cluster mean. This ultimately yields two vectors for comparison. In step (2), the SAM 110 then uses any comparison technique to compare the two vectors, such as by computing the L2 distance between the vectors. By performing this same procedure for each pairing of the new token and a cluster mean, the SAM 110 can identify the set of clusters which are within a prescribed threshold distance of the new token (if any). This yields zero, one, or more candidate tokens for verification in block 1106 of the procedure 1102.

Figure 14:
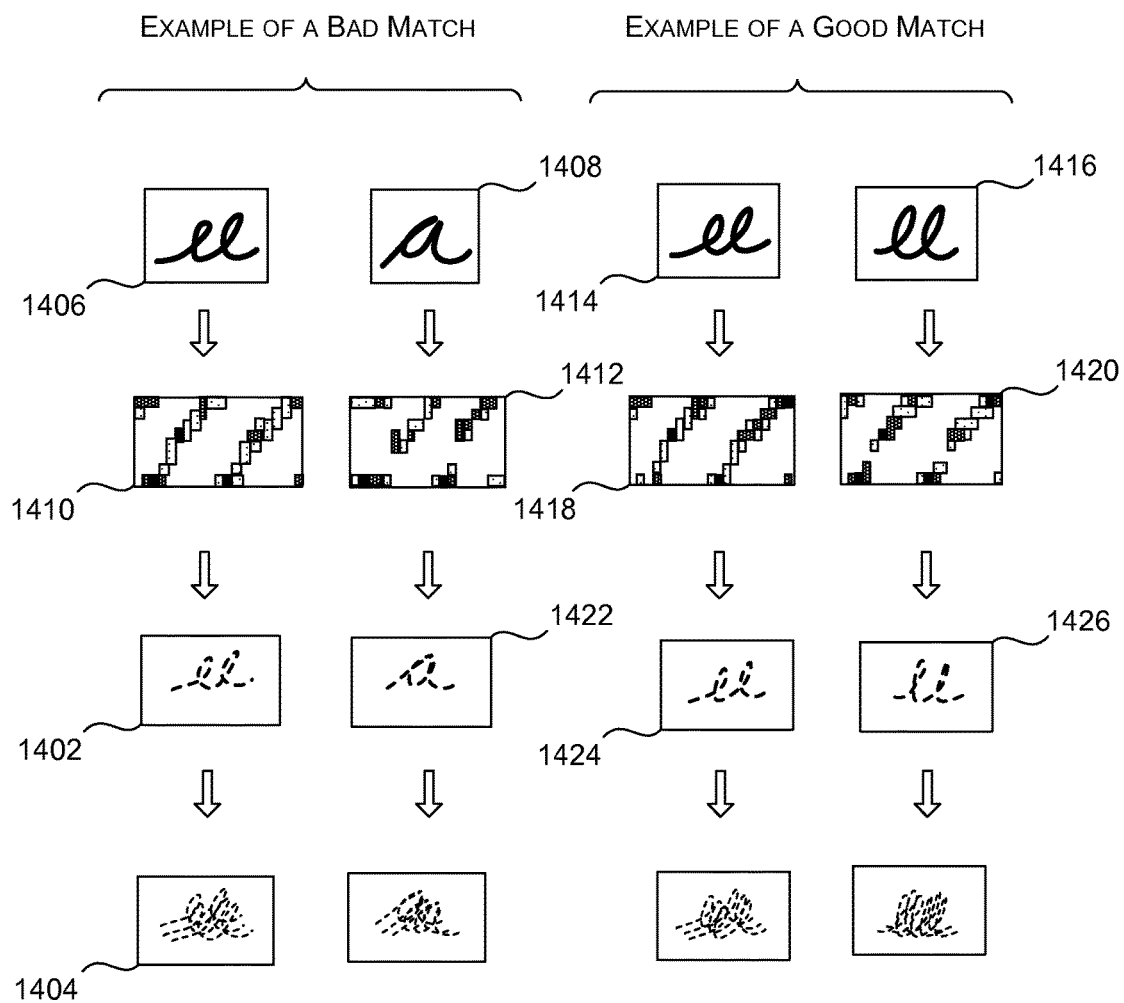
FIG. 14 is an example of spatial fine-level similarity processing that may be performed by the similarity assessment module of FIG. 10.

Block 1106 in FIG. 11, together with the example of FIG. 14, illustrate one technique for performing fine-level spatial analysis on each candidate token to be compared with the new token. In step (1.1), the SAM 110 begins by forming a low-resolution descriptor of each token to be compared, such as the low-resolution descriptor 1402 shown in FIG. 14. In other words, the SAM 110 provides a spatial rendering of the token, duplicating its appearance as drawn by the user. In step (1.2), the SAM 110 weights the intensity of the rendered strokes by their respective temporal distances to the center of the token. In other words, when drawing the token, the user produces strokes in a certain temporal order; the SAM 110 weights the strokes that were made at the beginning and end of the process the least, and the strokes that occur in the middle of the process the most. In step (1.3), the SAM 110 spatially blurs the results of step (1.2) by a few pixels, e.g., to produce the blurred descriptor 1404. In step (1.4), the SAM 110 centers the token content in the blurred descriptor produced in step (1.3), e.g., so that the middle of the token is placed in the middle of the descriptor.

The SAM 110 performs the above-described process for each pair of tokens to be compared for verification. For example, the SAM 110 can perform the above-described process on a new token and a particular cluster mean that was identified by the coarse-level analysis performed in block 1104. This yields two descriptors for the two respective tokens being compared. In step (2), the SAM 110 then computes the distance between each pair of descriptors using any technique, such as by forming the L2 distance. More specifically, the SAM 110 can form the difference between each position in a first descriptor with each corresponding position in a second descriptor, yielding, as a whole, a plurality of differences. The similarity assessment module sums these differences to generate a final distance measure q. In step (3), the SAM 110 can form a final confidence score $\lambda$ using a normal distribution on the distance measure q, e.g., using the equation $\lambda=\exp(-q/2\sigma^2)$.

The SAM 110 performs the fine-grained spatial analysis (in block 1106) described above because the coarse-grained temporal analysis (in block 1104) may not always be sufficient to identify similar tokens. The example of FIG. 14 demonstrates this point. As shown there, a double-"e" token 1406 and an "a"-character token 1408 yield the respective temporal descriptors (1410, 1412). By comparison, two double-"e" tokens (1414, 1416) yield the respective temporal descriptors (1418, 1420). An observer can see that the double-"e" token 1406 is not a good match with the "a"-character token 1408. Yet the distinction between descriptors 1410 and 1412 is not much greater than the distinction between the descriptors 1418 and 1420. In other words, the temporal analysis fails to clearly reveal the difference between the double-"e" token 1406 and the "a"-character token 1408. To address this shortcoming, the SAM 110 performs the above-described spatial comparison between descriptors. There is, in fact, a salient difference between the spatial descriptor 1402 (corresponding to the double-"e" token 1406) and the spatial descriptor 1422 (corresponding to the "a"-character token 1408), relative to the difference between spatial descriptors 1424 and 1426 (corresponding to two double-"e" tokens, 1414 and 1416).

As described above, the SAM 110 can compare each new token with respect to each individual previous token. Or to be more efficient, the SAM 110 can compare each new token with each cluster mean. But comparison using cluster means may itself represent a resource-intensive computation. To address this issue, the remainder of this section describes one technique for further expediting the search to find similar previous tokens.

Figure 15:
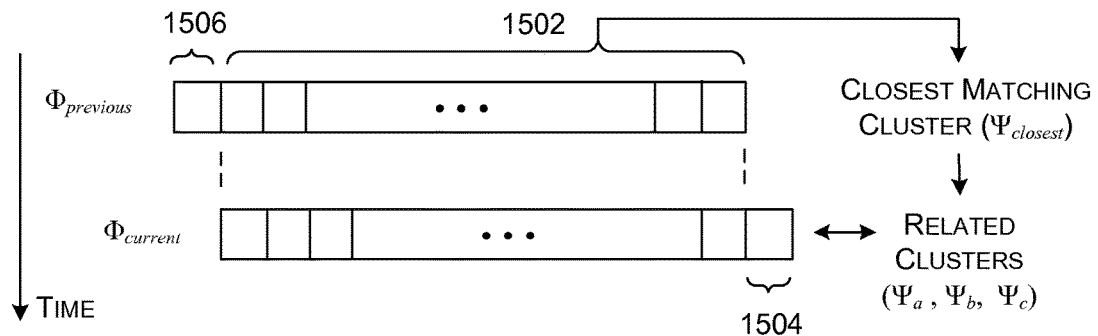
FIG. 15 shows an example of two tokens, one occurring immediately after the other.

First consider the example of FIG. 15. This figure shows a current token ($\Phi_{current}$), which represents the most recent token that has been processed by the SPS 102. This current token is preceded by a previous token ($\Phi_{previous}$). As described above, the current token has 30 samples in common with the previous token, corresponding to portion 1502. That is, the new token adds one sample 1504 that is not present in the previous token, and omits one token 1506 that is present in the previous token. Further assume that the SAM 110 has already determined that the previous token is most similar to a particular cluster mean, $\Psi_{closest}$. If there is no good match between $\Psi_{previous}$ and an existing cluster mean, then $\Psi_{previous}$ is assigned to a new cluster with $\Psi_{closet}=\Phi_{previous}$.

The SAM 110 can pre-compute the clusters which are similar $\Psi_{closest}$. Assume, for example, that the cluster management module 1002 is forced to define a new cluster for $\Phi_{previous}$ because there is no existing cluster which is sufficiently similar to $\Phi_{previous}$. After creating the new cluster, the SAM 110 compares the portion 1502 with other existing cluster means, with the omission of the terminal sample in these other cluster means, e.g., corresponding to sample 1504. Assume, for example, that the SAM 110 determines that the portion 1502 is similar to cluster means $\Psi_a$, $\Psi_b$, and $\Psi_c$, when the terminal sample is removed from these cluster means. The SAM 110 then stores this association, e.g., in a lookup table or the like. That is, the association links $\Psi_{closet}$ with cluster means $\Psi_a$, $\Psi_b$, and $\Psi_c$. Then, when closest it comes time to compute the similarity between the current cluster and the cluster means ($\Phi_{current}$), the SAM 110 can compare the current token with the related cluster means $\Psi_a$, $\Psi_b$, and $\Psi_c$, rather than the entire set of cluster means (which may be a large number). The comparison is made by considering the full version of each of these related cluster means, e.g., by now including the terminal sample of these cluster means in the comparison.

Figure 16:
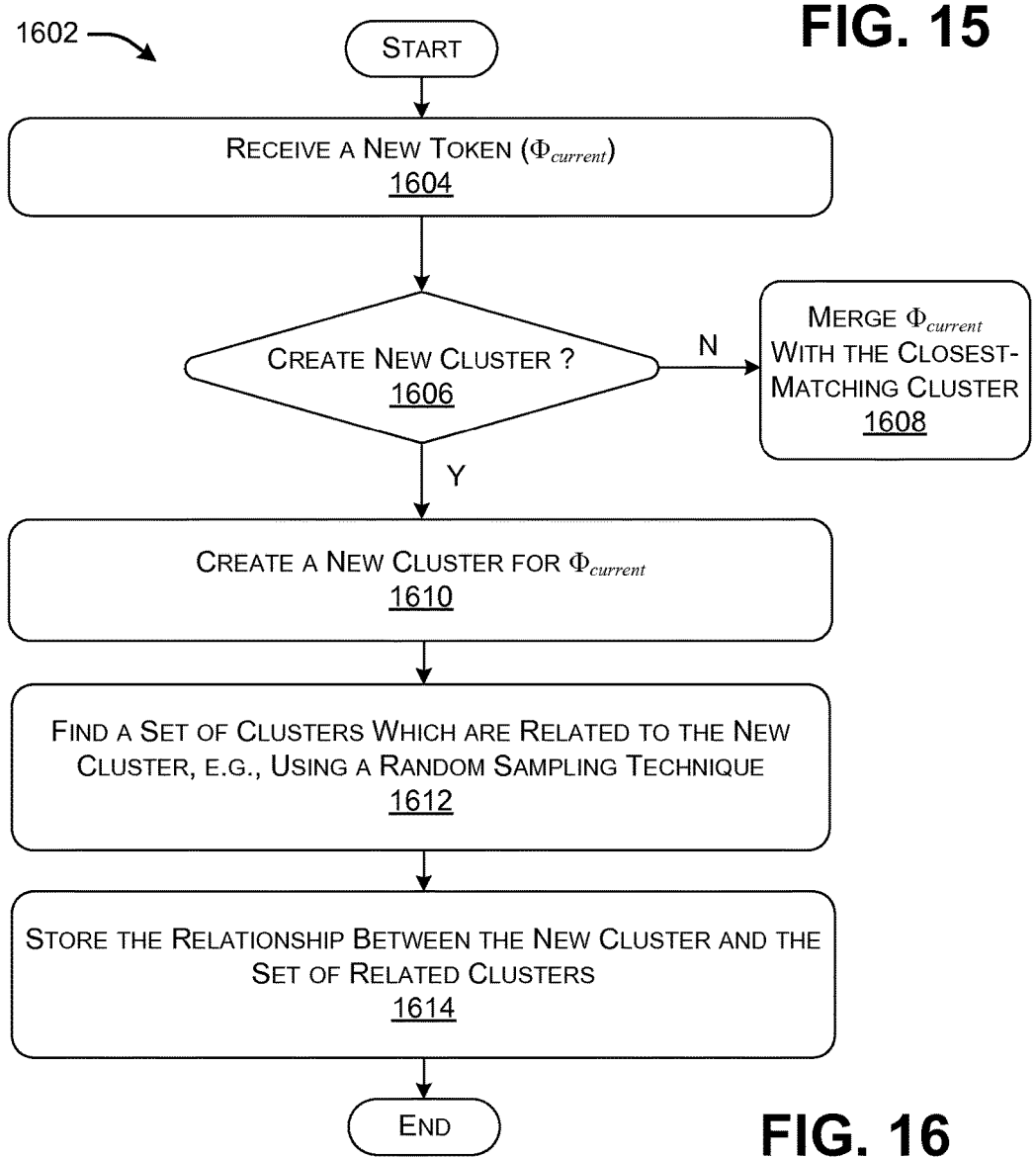
FIG. 16 is a flowchart that describes one way of identifying relationships among similar token clusters.

FIG. 16 shows a procedure 1602 for establishing the relationship between a token and a related set of clusters, e.g., in the above case, by establishing the relationship between the portion 1502 and its set of related cluster means ($\Psi_a$, $\Psi_b$, $\Psi_c$). The procedure 1602 is performed by the cluster management module 1002 using the SAM 110. In block 1604, the cluster management module 1002 receives a new token ($\Phi_{current}$). In block 1606, the cluster management module 1002 determines whether the new token is sufficiently similar to one of the existing clusters. If so, in block 1608, the cluster management module 1002 merges the new token with the cluster mean of the closest-matching cluster. Since this cluster already exists, it is not necessary to compute the set of other clusters which are related to this closest-matching cluster; that is, the assumption is that the cluster management module 1002 has already determined the related set for this closest-matching cluster, e.g., when it was initially created.

Alternatively, in block 1610, assume that the new token does not match any existing clusters. In response, the cluster management module 1002 creates a new cluster associated with the new token. In block 1612, the cluster management module 1002 then attempts to find the set of other clusters which are related to the new token (where the comparison is, more precisely stated, between the portion 1502 and the version of each cluster mean that omits the terminal sample of the cluster mean). In one approach, the cluster management module 1002 can perform this task by comparing the new token with each existing individual cluster mean. In another approach, the cluster management module 1002 can perform this task by randomly sampling a prescribed number γ of cluster means. Assume that, in this random search, the cluster management module 1002 discovers a cluster mean t which is related to the new token. The lookup table will reveal that cluster t, in turn, is related to a predetermined set of clusters (e.g., clusters $f$, g, h, etc.). Based on this knowledge, the cluster management module 1002 then determines the similarity between the new token and each of the discovered related tokens, e.g., by comparing the new token with cluster mean $f$, cluster mean g, cluster mean h, and so on. In block 1614, the cluster management module 1002 stores the relationships established in block 1612, e.g., by storing an index which links the new cluster that has been created (to hold the new token) with the discovered set of related cluster means. The procedure 1602, considered as a whole, establishes a cross-linked collection of clusters, where the lookup table links ever cluster with a related set of clusters (if any).

Figure 17:
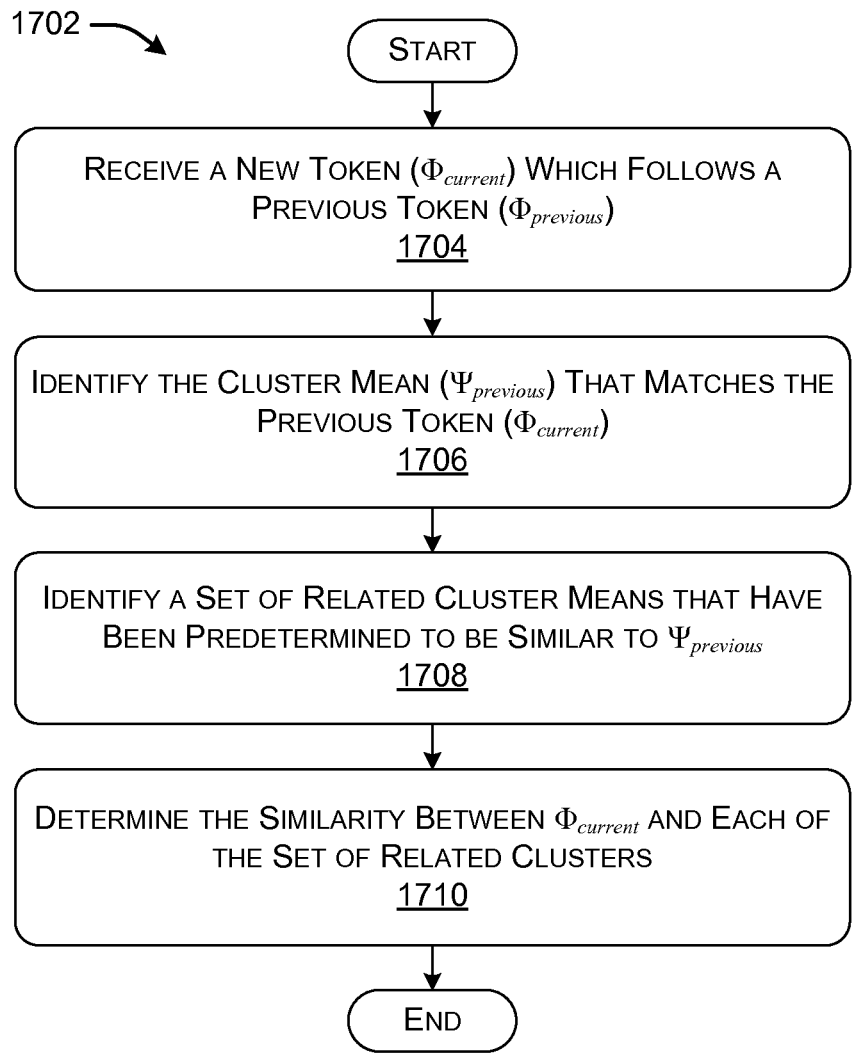
FIG. 17 is a flowchart which describes one way of expediting the similarity processing performed by the similarity assessment module of FIG. 10, e.g., by leveraging the relationships produced using the process of FIG. 16.

FIG. 17 shows a procedure 1702 for applying the relationships learned via the procedure 1602 of FIG. 16. In block 1704, the SAM 110 receives a new token ($\Phi_{current}$) which follows a previous token ($\Phi_{previous}$) In block 1706, the SAM 110 identifies the cluster mean ($\Psi_{previous}$) which matches the previous token. (Note that the SAM 110 has determined this cluster mean in a previous step, when the previous token constituted the current token.) In block 1708, the SAM 110 identifies a set of related cluster means that have been predetermined to be similar to $\Psi_{previous}$. In block 1710, the SAM 110 compares the new token with each of the cluster means in the set of identified cluster means.

D. Token Refinement Module

Figure 18:
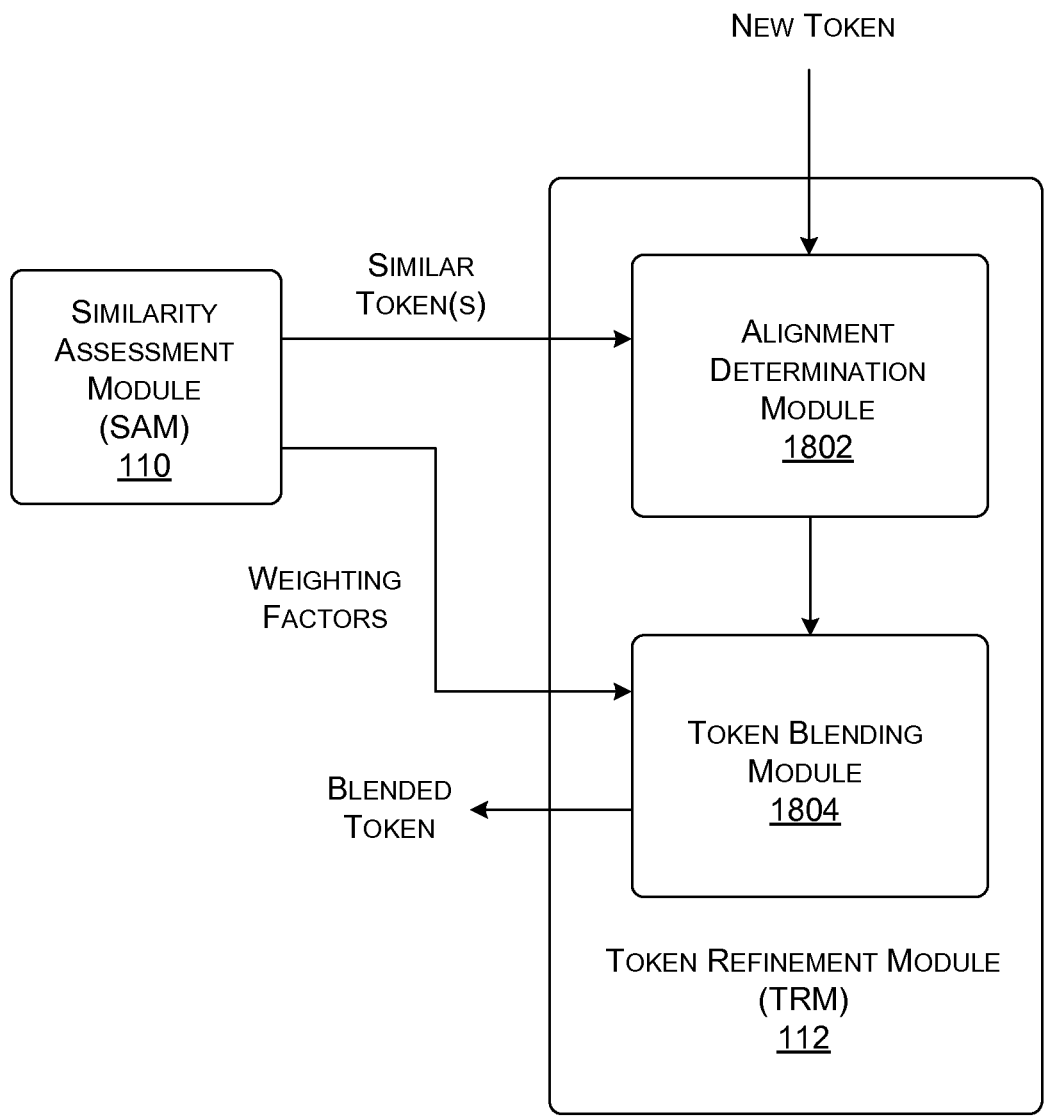
FIG. 18 shows one illustrative implementation of a token refinement module, which is another component of the SPS of FIG. 1.

FIG. 18 shows one implementation of the token refinement module (TRM) 112 of FIG. 1. The TRM 112 receives the new token and each of the similar tokens identified by the SAM 110. Consider the simplified case in which just two tokens are to be merged. An alignment determination module 1802 aligns the samples of the first token with the corresponding tokens of the second sample. This produces correlated tokens. A token blending module 1804 then blends the correlated tokens with each other.

In one application, the SPS 102 calls on the TFM 112 to blend a new token with a cluster mean that is determined to most closely match the new token. The SPS 102 performs this task when it operates to update its set of clusters stored in the data store 108. In another application, the SPS 102 calls on the TRM 112 to blend a new token with a set of cluster means that have been determined to match the new token, within some threshold level of similarity. The SPS 102 performs this task when it seeks to refine the appearance of the new token based on previous similar tokens.

Figure 19:
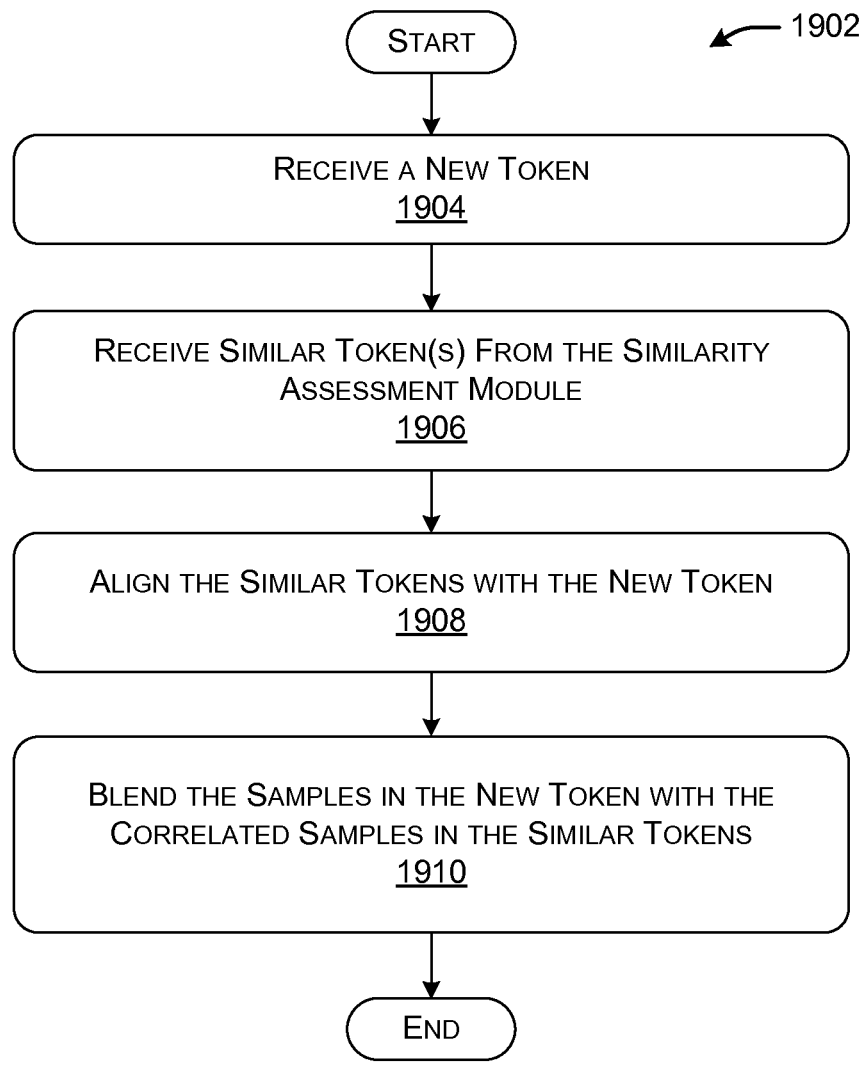
FIG. 19 is a flowchart that shows one manner of operation of the token refinement module of FIG. 18.

FIG. 19 is a procedure 1902 which summarizes the operation of the TRM 112. In block 1904, the TRM 112 receives a new token. In block 1906, the TRM 112 receives one or more similar tokens from the SAM 110. In block 1908, the TRM 112 aligns each of the previous tokens with the new token (using a technique to be described below). In block 1910, the TRM 112 can blend the samples of the new token with the correlated samples in the similar previous token(s).

More specifically, the TRM 112 can perform the operations of block 1910 by converting each endpoint that will contribute to the average from polar coordinates to Cartesian coordinates, e.g., using $x_k = r_k \cos(\theta_k)$ and $y_k = r_k \sin(\theta_k)$, where ($r_k$, $\theta_k$) corresponds to one of the samples to be averaged. The TRM 112 can then average all the x values (associated with the contributing samples) together to provide an average x for the resultant averaged sample, and similarly for the y values. The TRM 112 can then convert the resultant averaged sample points back into polar coordinates. The TRM 112 can compute a blended pressure value by averaging the individual p values, where each individual p value is weighted by the magnitude (r) of its corresponding sample. Note that, when performing blending for the purpose of beautifying a new token, the TRM 112 can perform additional computations that are not specified in FIG. 19, but will be described below.

Figure 20:
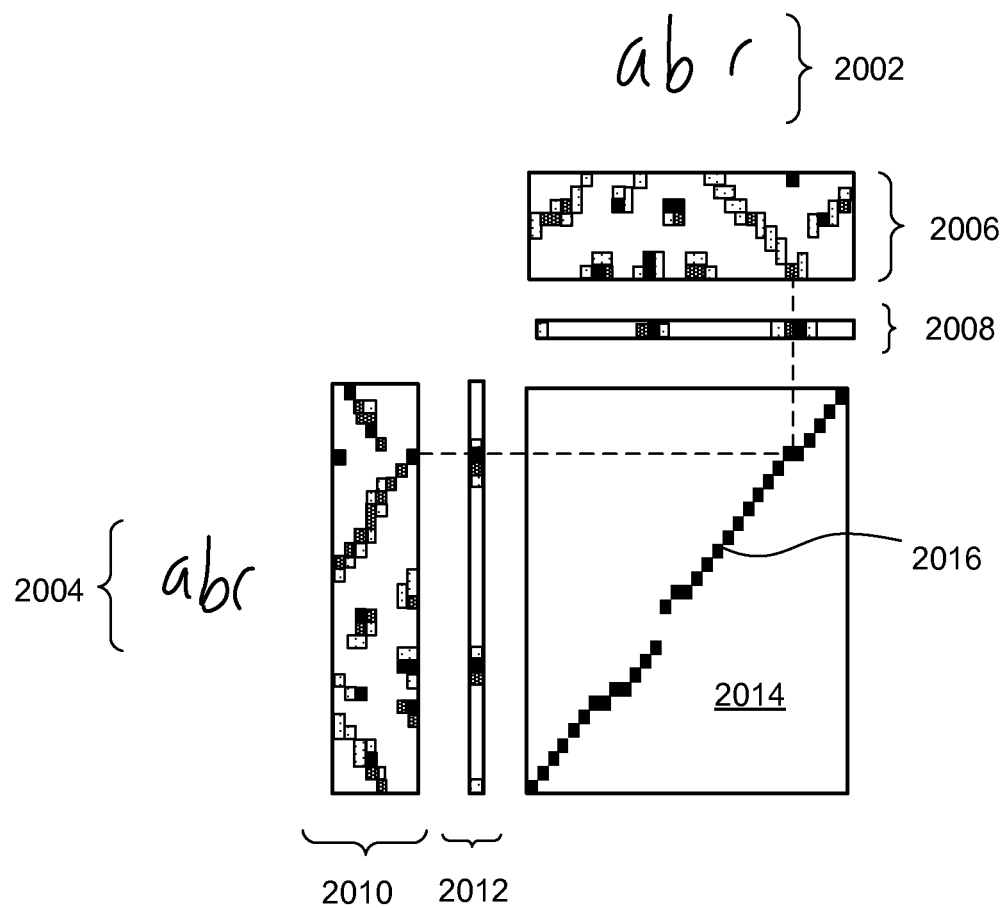
FIG. 20 is an example of alignment processing that may be performed by the token refinement module of FIG. 18.

FIG. 20 shows one technique for determining the correlation between samples in a first token 2002 and a second token 2004. The first token 2002 is represented by a first descriptor 2006 which presents orientation (θ) and magnitude (r) values as a function of samples (φ), and a second descriptor 2008 which presents pressure (p) values as a function of samples (φ). Likewise, the second token 2004 is described by first and second descriptors (2010, 2012). The alignment determination module 1802 first computes a cost matrix 2014. Each cell in the cost matrix is defined by a first index which identifies a sample in the first token 2002 and a second index which identifies a sample in the second token 2004. The cell has a value which describes the difference (ω) between the identified samples in the first and second tokens (2002, 2004). In one case, the difference can be computed as:

$$\omega = \Delta_r + \Delta_\theta + \delta_p.$$

In this equation, the value $\Delta_r$ corresponds to the absolute difference between the magnitudes of the two tokens, e.g., $\Delta_r = |r_{token1} - r_{token2}|$. The value $\Delta_\theta$ corresponds to the absolute angular distance between the orientation values of the two tokens, e.g., $\Delta_\theta = |\theta_{token1} - \theta_{token2}|$. The value $\delta_p = 1$ if $p_{token1} = 0$ and $p_{toekn2} = 0$, or if $p_{token1} > 0$ and $p_{token2} > 0$; the value of $\delta_p$ is 1 otherwise.

The alignment determination module 1802 then finds a least cost path 2016 through the cost matrix 2014, from cell $c_{11}$ to cell $c_{nn}$. In choosing the path, the alignment determination module 1802 can choose from among three moves at each step {(0,1), (1,0), and (1,1)}, corresponding to: (a) a move from left to right,→; (b) a move in the upward direction, ↑; and (3) a diagonal move, ↗. Each move to a destination cell has a particular cost value associated with it, defined by ω+ξ, where small cost values are more preferable than large cost values. The value ω is defined above; in this context, ω measures the similarity between the two tokens that are identified by the indices of the destination cell. The value favors diagonal moves by assigning a value of 0 for a diagonal move and a small positive value (e.g., 0.2) otherwise. The alignment determination module 1802 can use any technique to compute the path 2016, such as, but not limited to, a dynamic programming technique.

The token blending module 1804 can blend a new token with similar previous tokens (for the purpose of stroke beautification) in the following manner. First consider the observation that any given stroke sample $\varphi_i$ in a new token may actually represent a sample in n different tokens, i.e., $\Phi_{i-n}$ to $\Phi_i$ (that is, presuming that $\varphi_i$ is at least one token length "old"). Each of these tokens $\Phi_j$ with $j \in [i-n, i]$ has its own set of candidate cluster matches $m_j$ with corresponding confidence scores $\lambda_{jk}$, $k \in m_j$. The confidence score $\lambda_{jk}$ refers an extent to which a token $\Phi_j$ matches the cluster mean $\Psi_k$, which may be computed using a normal distribution on the L2 distance. For the cluster mean $\Psi_k$, the sample $\varphi_l \in \Psi_k$ with $l=i-j$ will contribute to the refinement of the stroke sample $\varphi_i$. The weight $w_{ijk}$ assigned to the sample $\varphi_l$ can be computed using, $$w_{ijk} = \sum_{j \in [i-n,i]} \sum_{k \in m_j} \lambda_{jk} \mathcal{N}\left(l; \frac{n}{2}, \sigma\right).$$

In this equation, N refers to a normal distribution with, for example, a mean of n/2 and standard deviation of $\sigma = n/6$. The use of a Gaussian weighting ensures a smooth transition between the contributions of various tokens in the refinement.

Using the above weights, the token blending module 1804 can now calculates the $\tilde{x}_i$ Cartesian value of a refined endpoint as follows:

$$\tilde{x}_i = \frac{x_i + \sum_{j \in [i-n,i]} \sum_{k \in m_j} w_{ijk} s_k x_l}{1 + \sum_{j \in [i-n,i]} \sum_{k \in m_j} w_{ijk} s_k}.$$

In this equation, $x_i$ refers to an x coordinate value in the new token to be refined, and $x_l$ corresponds to a coordinate value in a cluster mean, which contributes to the refinement of the new token. These Cartesians values can be computed from the stored polar coordinates in the manner described above. The value $w_{ijk}$ corresponds to the weighting factor that is computed in the manner described above. The value $s_k$ reflects the size of the cluster k, e.g., corresponding to the square root of the cluster's size; hence, the above equation assigns a higher weight to larger clusters. The refined value of the Cartesian coordinate $\tilde{y}_i$, and the refined value of the pressure $\tilde{p}_i$, can be computing using a similar manner to that described above for $\tilde{x}_i$. In practice, the token blending module 1804 may wait until a sample is at least one token length "old" before refining it.

E. Other Applications.

Figure 21:
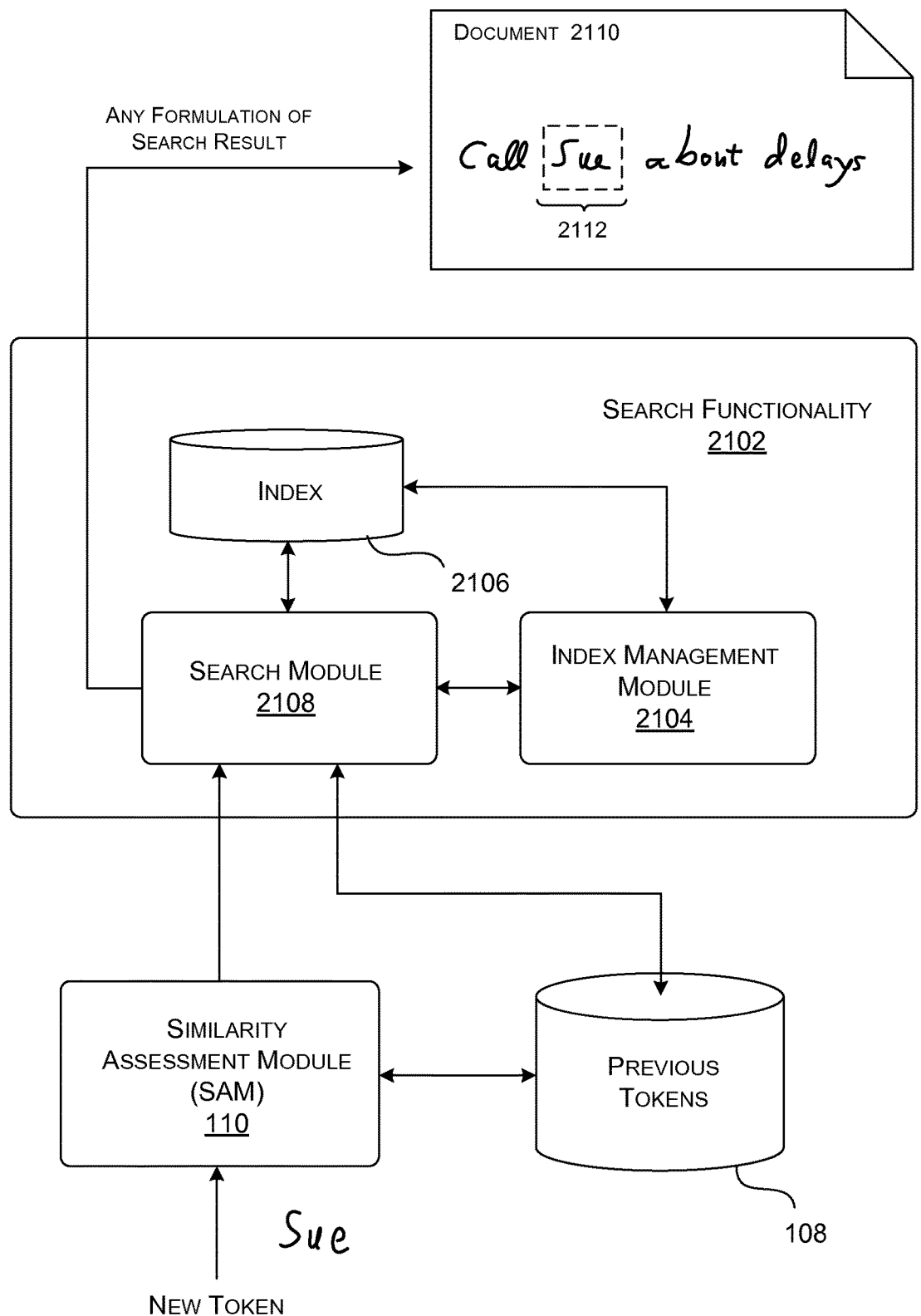
FIG. 21 shows one implementation of search functionality. The search functionality leverages the results of the similarity assessment module of FIG. 10.

FIG. 21 shows one implementation of search functionality 2102, which represents another application of the SPS 102, instead of, or in addition to, the refinement application. The search functionality 2102 includes an index management module 2104 for creating and managing an index. A data sore 2106 stores the index. More specifically, the index management module 2104 stores a link between the previously encountered tokens and the respective locations of those tokens within documents. For example, assume that a user has written the word "Sue" several times in the past. The SAM 110 may identify one or more clusters which contain tokens associated with this word. The index management module 2104 also stores information in the index which describes the locations at which the tokens appear within documents that the user has previously created.

A search module 2108 can provide any search result in response to the user's input tokens. For example, assume that the user again inputs the word "Sue." The search module 2108 can, first of all, receive information from the SAM 110, which indicates the token(s) that are associated with the word "Sue." The search module 2108 can then interact with the index to determine the respective locations of previous instances of the word "Sue" in the documents that have been previously created by the user. The search module 2108 may then notify the user of those previous occurrences in any manner, such as by displaying a document 2110 containing the word Sue 2112, and highlighting that word Sue 2112 in that document 2110 in any manner.

Figure 22:
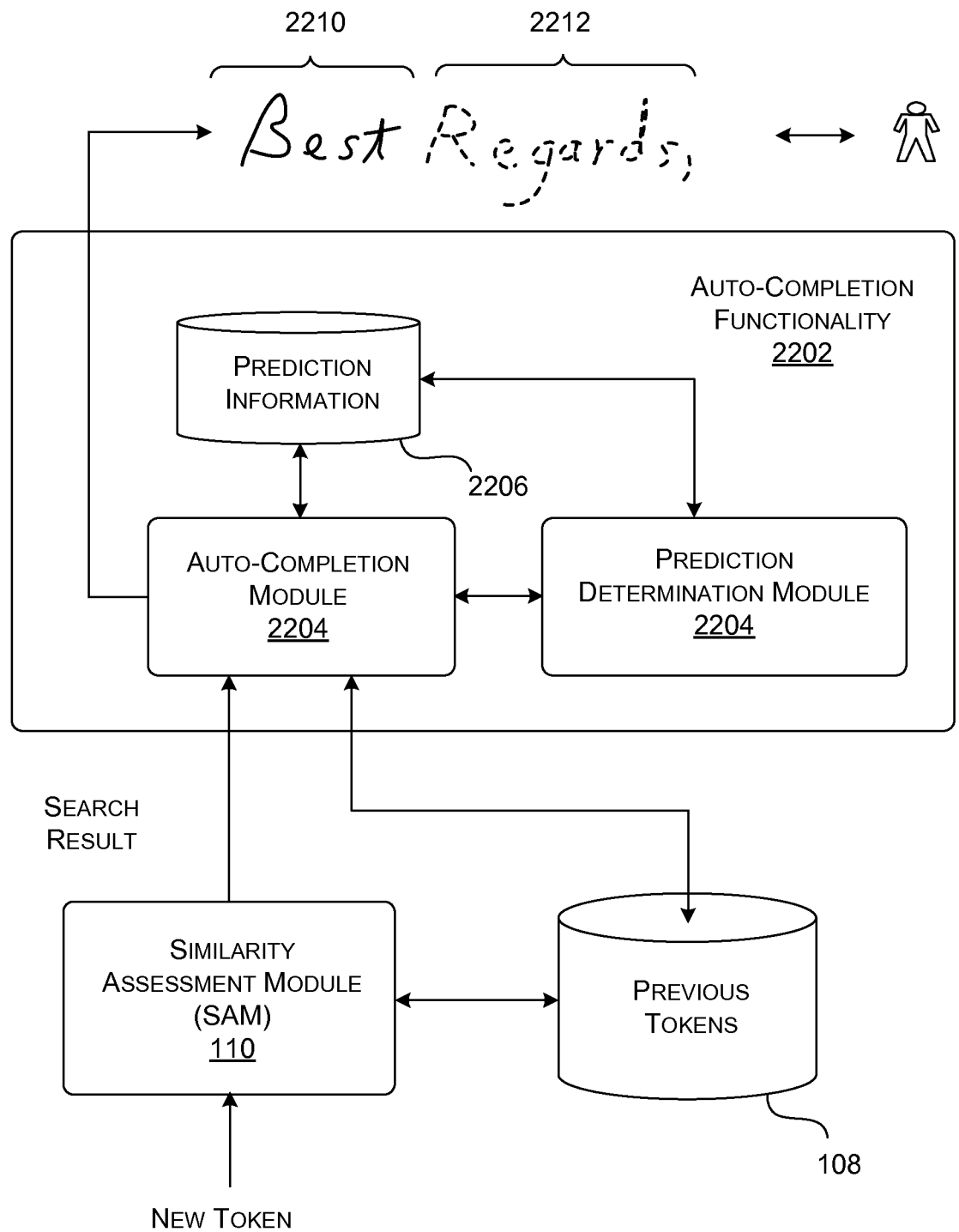
FIG. 22 shows one implementation of auto-completion functionality. The auto-completion functionality also uses the results of the similarity assessment module of FIG. 10.

FIG. 22 shows one implementation of auto-completion functionality 2202, which represents another application of the SPS 102, instead of, or in addition to, the refinement application. The auto-completion functionality 2202 includes a prediction determination module 2204 which predicts the likelihood that one token will follow another token. The auto-completion functionality 2202 can perform this task in any manner, e.g., by counting co-occurrences of tokens within a training corpus, and then training an n-gram model based on those count values. A data store 2206 can store prediction information which indicates the predictions made by the prediction determination module 2204.

An auto-completion module 2208 performs an auto-completion operation based on the prediction information stored in the data store 2206. Assume, for example, that the user inputs the word "Best" 2210, with a capital "B." The SAM 110 can interpret this word by matching the tokens associated with this word with previous tokens. The auto-completion module 2208 receives the matching token information from the SAM 110. In response, it determines, based on the prediction information in the data store 2206, the tokens (if any) which are likely to follow the tokens that make up the word "Best." Assume that the user has written the phrase "Best regards" many times in the past when closing his or her handwritten letters. The auto-completion module 2208 may therefore identify the tokens that make up the word "Regards" as a likely word to follow the word "Best."

The auto-completion module 2208 can then present its findings to the user in any manner, such as by displaying the word "Regards" 2212 next to the word "Best." The user can select the word "Regards" to formally add this word to his or her writing, or continue writing to effectively ignore the recommendation of the auto-completion functionality 2202.

The search functionality 2102 and auto-completion functionality 2202 were described above by way of example, not limitation. Other applications can leverage the above-described features of the SPS 102.

Figure 23:
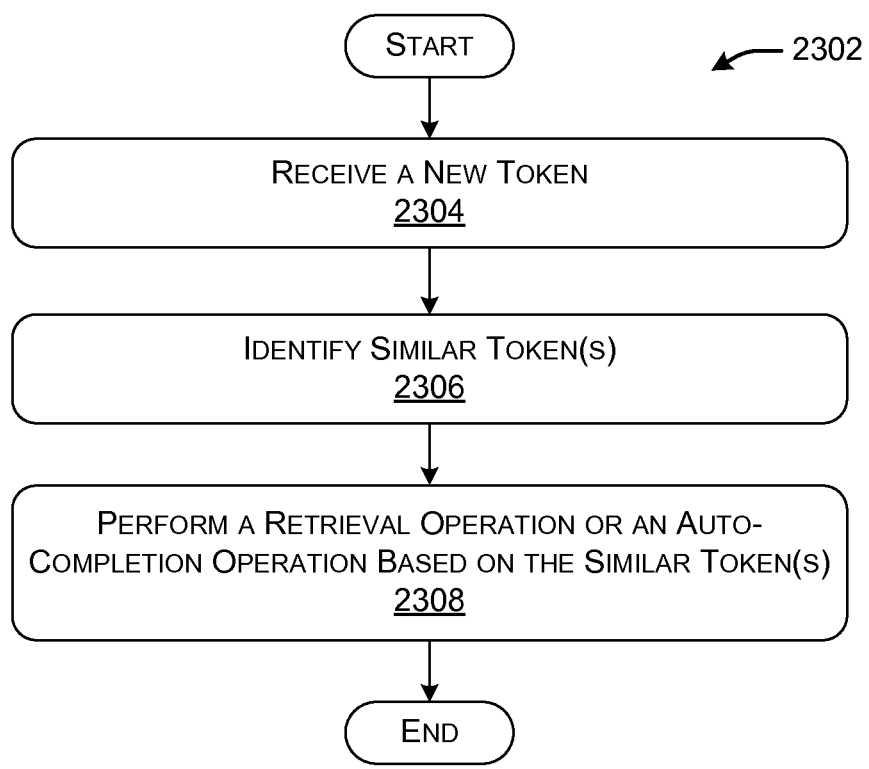
FIG. 23 is a flowchart that shows one manner of operation of the search functionality (of FIG. 21) and the auto-completion functionality (of FIG. 22).

FIG. 23 shows a procedure 2302 which provides an overview of the operation of the search functionality 2102 and auto-completion functionality 2202. In block 2304, the SPS 102 receives a new token. In block 2306, the SPS 102 identifies previous tokens (if any) which are similar to the new token. In block 2308, the SPS 102 performs a search operation and/or auto-completion operation based on the similar token(s) identified in block 2306.

F. Representative Computing Functionality

Figure 24:
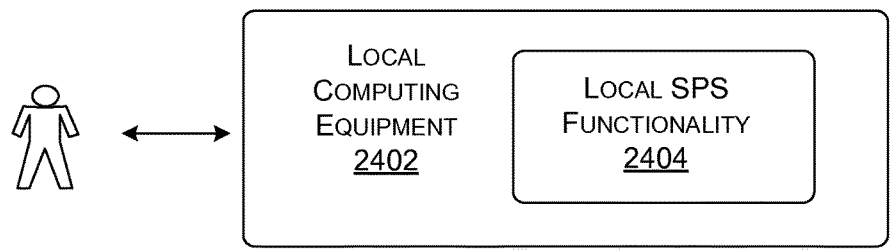
FIG. 24 shows a standalone implementation of the SPS of FIG. 1.

FIG. 24 represents a standalone implementation of the SPS 102 of FIG. 1. That is, in this implementation, local computing equipment 2402 can implement all aspects of the SPS 102. FIG. 24 conveys this point by indicating that the local computing equipment 2402 includes local SPS functionality 2404. The local computing equipment 2402 can be implemented by a personal computer, a computer workstation, a laptop computer, a tablet-type computer, a game console, a set-top box device, a media consumption device, a smartphone, and so on.

Figure 25:
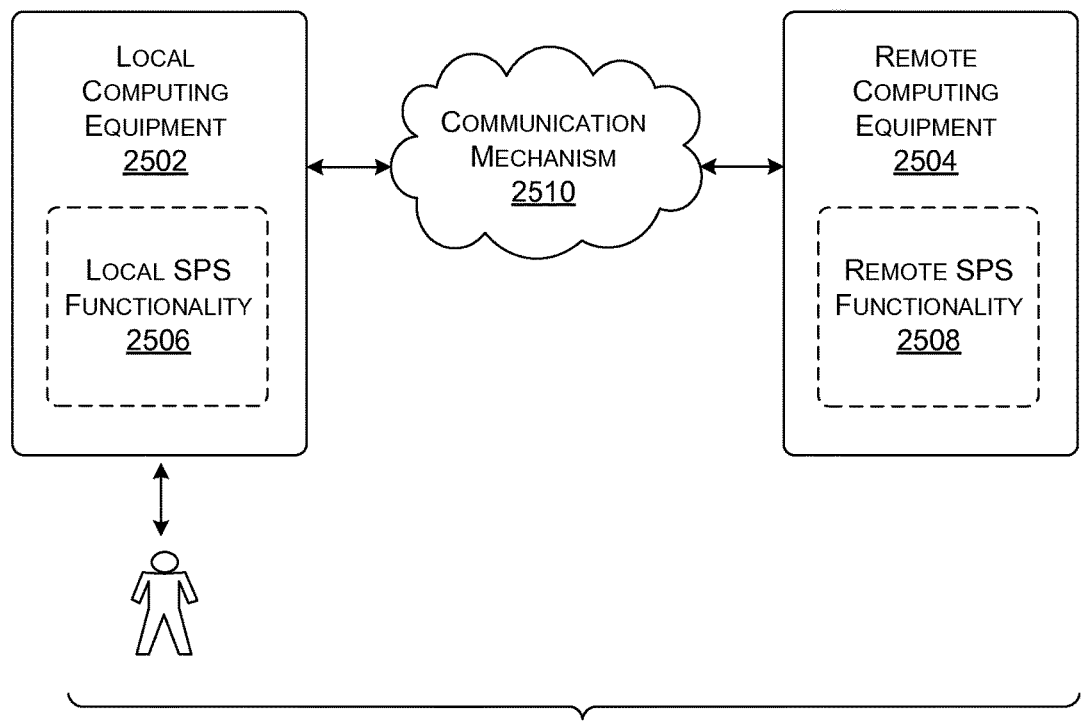
FIG. 25 shows a distributed implementation of the SPS of FIG. 1.

FIG. 25 shows a distributed implementation of the SPS 102, where the SPS functionality is distributed between local computing equipment 2502 and remote computing equipment 2504. That is, the local computing equipment 2502 may implement local SPS functionality 2506, while the remote computing equipment 2504 may implement remote SPS functionality 2508. The local computing equipment 2502 can be implemented using any technology described above with respect to FIG. 24. The remote computing equipment 2504 can be implemented, for instance, using one or more servers and associated data stores. A communication mechanism 2510 may connect the local computing equipment 2502 with the remote computing equipment 2504. The communication mechanism 2510 can be implemented using a local area network, a wide area network (e.g., the Internet), a point-to-point connection, etc., or any combination thereof.

In one scenario, for example, the remote SPS functionality 2508 can maintain the data store 108 which stores the previous tokens. The remote SPS functionality 2508 can download the previous tokens to the local SPS functionality 2506 for use by the local SPS functionality 2506 in analyzing handwriting. In another case, the remote SPS functionality 2508 can also perform one or more processing functions of the SPS 102, as described above. For example, the local SPS functionality 2506 can offload its most resource-intensive computations to the remote SPS functionality 2508.

FIG. 26 sets forth illustrative computing functionality 2600 that can be used to implement any aspect of the functions described above. For example, the type of computing functionality 2600 shown in FIG. 26 can be used to implement any aspect of SPS 102 of FIG. 1, using the functionality of FIG. 24, the functionality of FIG. 25, or some other functionality. In one case, the computing functionality 2300 may correspond to any type of computing device that includes one or more processing devices. In all cases, the computing functionality 2300 represents one or more physical and tangible processing mechanisms.

The computing functionality 2600 can include volatile and non-volatile memory, such as RAM 2602 and ROM 2604, as well as one or more processing devices 2606 (e.g., one or more CPUs, and/or one or more GPUs, etc.). The computing functionality 2600 also optionally includes various media devices 2608, such as a hard disk module, an optical disk module, and so forth. The computing functionality 2600 can perform various operations identified above when the processing device(s) 2606 executes instructions that are maintained by memory (e.g., RAM 2602, ROM 2604, or elsewhere).

More generally, instructions and other information can be stored on any computer readable medium 2610, including, but not limited to, static memory storage devices, magnetic storage devices, optical storage devices, and so on. The term computer readable medium also encompasses plural storage devices. In many cases, the computer readable medium 2610 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 2600 also includes an input/output module 2612 for receiving various inputs (via input devices 2614), and for providing various outputs (via output devices). Illustrative input devices include a keyboard device, a mouse input device, a touchscreen input device, a digitizing pad, a gesture input device, a voice recognition mechanism, tabletop or wall-projection input mechanisms, and so on. One particular output mechanism may include a presentation device 2616 and an associated graphical user interface (GUI) 2618. The computing functionality 2600 can also include one or more network interfaces 2620 for exchanging data with other devices via one or more communication conduits 2622. One or more communication buses 2624 communicatively couple the above-described components together.

The communication conduit(s) 2622 can be implemented in any manner, e.g., by a local area network, a wide area network (e.g., the Internet), etc., or any combination thereof. The communication conduit(s) 2622 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, functionality described herein can employ various mechanisms to ensure the privacy of user data maintained by the functionality (if any). For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more hardware processing devices; and
one or more storage devices storing computer readable instructions which, when executed by the one or more hardware processing devices, cause the one or more hardware processing devices to:
store a collection of previous tokens obtained by processing previous handwriting instances produced by a user with a writing implement, the previous tokens representing subsets of previous temporally adjacent input stroke samples in the previous handwriting instances;

process a new handwriting instance produced by the user using the writing implement to obtain a new token representing new temporally adjacent input stroke samples in the new handwriting instance;

generate a first temporal descriptor for at least one previous token of the collection, the first temporal descriptor reflecting pressure over time of the writing implement when the user produced the previous handwriting instances, and generate a second temporal descriptor reflecting pressure over time of the writing implement when the user produced the new handwriting instance;

designate the at least one previous token as a selected previous token responsive to a determination that the first temporal descriptor and the second temporal descriptor are within a prescribed threshold; and modify an appearance of the new handwriting instance produced by the user by modifying coordinates of the new token using previous coordinates of the selected previous token.

2. The system of claim 1, wherein the new handwriting instance comprises one or more of:
 handwritten characters; and
 handwritten pictures.

3. The system of claim 1, wherein the computer readable instructions further cause the one or more hardware processing devices to:
 perform a temporal-based comparison of the first temporal descriptor, the second temporal descriptor, and additional temporal descriptors to determine that the first temporal descriptor and the second temporal descriptor are within the prescribed threshold and to identify a set of candidate tokens that includes the at least one previous token;
 perform a spatial-based comparison of the new token with the set of candidate tokens; and
 designate the at least one previous token as the selected previous token based at least on the temporal-based comparison and the spatial-based comparison.

4. The system of claim 1, wherein the computer readable instructions further cause the one or more hardware processing devices to:
 align input stroke samples associated with the selected previous token with the new temporally adjacent input stroke samples produced by the user to produce at least one correlated stroke sample; and
 use the at least one correlated stroke sample to modify the appearance of the new handwriting instance produced by the user.

5. A method performed by one or more computer devices, the method comprising:
 receiving input stroke samples that represent handwriting produced by a user using a writing implement with an input device;
 formulating a new token based at least in part on a subset of the input stroke samples that are temporally adjacent;
 examining a collection of previous tokens representing previous temporally adjacent handwriting strokes produced by the user;
 forming a first temporal descriptor for at least one previous token of the collection and a second temporal descriptor for the new token, the first temporal descriptor and the second temporal descriptor related to pressure of the writing implement against the input device;
 determining a relative similarity between the first temporal descriptor and the second temporal descriptor;
 in an instance where the relative similarity meets a prescribed threshold, designating the at least one previous token as a selected token and modifying coordinates of the subset of the input stroke samples using previous coordinates of the selected token to provide an output result; and
 presenting the output result on an output device.

6. The method of claim 5, wherein the subset of the input stroke samples represents multiple handwritten characters produced consecutively by the user.

7. The method of claim 5, wherein the formulating comprises:
 resampling the input stroke samples to produce resampled stroke samples at a rate that is based at least in part on a degree of curvature in the handwriting.

8. The method of claim 5, wherein the examining comprises:
 clustering sets of the previous tokens of the user into clusters having associated cluster representatives, each cluster comprising relatively similar previous tokens, the at least one previous token being a particular cluster representative.

9. The method of claim 8, wherein the particular cluster representative represents an average of the relatively similar previous tokens in a corresponding cluster of the particular cluster representative.

10. The method of claim 8, further comprising:
 adding the new token to a corresponding cluster of the particular cluster representative; and
 in another instance where there is not a sufficiently similar cluster to another new token, creating a new cluster associated with the another new token.

11. The method of claim 8, wherein the determining the relative similarity further comprises:
 performing a temporal-based comparison of the new token with the cluster representatives using the first temporal descriptor, the second temporal descriptor, and additional temporal descriptors to identify a set of candidate tokens;
 performing a spatial-based comparison of the new token with each candidate token of the set of candidate tokens, the particular cluster representative being selected from the set of candidate tokens; and
 designating the particular cluster representative as the selected token based at least on the temporal-based comparison and the spatial-based comparison.

12. The method of claim 8, wherein the cluster representatives correspond to a group of cluster representatives that have been predetermined to be similar to a preceding token which precedes the new token.

13. The method of claim 5, wherein the output result is a modified form of the subset of the input stroke samples that represents the handwriting produced by the user.

14. The method of claim 5, wherein the selected token of the user comprises multiple previous tokens of the user and the modifying further comprises:
 aligning stroke samples associated with each of the multiple previous tokens with stroke samples of the subset of the input stroke samples to produce correlated stroke samples;
 averaging the correlated stroke samples; and
 modifying an appearance of the subset of the input stroke samples using the averaged correlated stroke samples.

15. The method of claim 5, further comprising producing a search result based at least in part on the at least one previous token of the user.

16. The method of claim 15, wherein the search result identifies an occurrence of at least some of the previous temporally adjacent handwriting strokes in a document containing handwriting produced by the user.

17. The method of claim 5, further comprising identifying, based at least in part on the at least one previous token of the user, a predicted token that is likely to follow the new token, and notifying the user of the predicted token.

18. A system comprising:

one or more hardware processing devices; and one or more storage devices storing computer readable instructions which, when executed by the one or more hardware processing devices, cause the one or more hardware processing devices to:

receive input stroke samples that represent handwriting produced by a user using a writing implement with an input device;

formulate a new token based at least in part on a subset of the input stroke samples that are temporally adjacent;

examine a collection of previous tokens representing previous temporally adjacent handwriting strokes produced by the user;

form a first temporal descriptor for at least one previous token of the collection and a second temporal descriptor for the new token, the first temporal descriptor and the second temporal descriptor related to pressure of the writing implement against the input device;

determine a relative similarity between the first temporal descriptor and the second temporal descriptor; and in an instance where the relative similarity meets a prescribed threshold, designate the at least one previous token as a selected token and modify coordinates of the subset of the input stroke samples using previous coordinates of the selected token to provide an output result.

19. The system of claim 18, wherein the computer readable instructions further cause the one or more hardware processing devices to:

display the output result on the input device.

20. The system of claim 18, wherein the previous tokens reflect overlapping subsets of the previous temporally adjacent handwriting strokes.

\* \* \* \* \*